(12) United States Patent
Fujita et al.

(10) Patent No.: US 12,551,609 B2
(45) Date of Patent: Feb. 17, 2026

(54) MEDICAL SOLID-MATTER COLLECTION APPARATUS AND MEDICAL SUCTION SYSTEM

(71) Applicant: OLYMPUS MEDICAL SYSTEMS CORP., Tokyo (JP)

(72) Inventors: Naoyuki Fujita, Tachikawa (JP); Shoei Tsuruta, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 628 days.

(21) Appl. No.: 17/953,400

(22) Filed: Sep. 27, 2022

(65) Prior Publication Data

US 2023/0104307 A1  Apr. 6, 2023

Related U.S. Application Data

(60) Provisional application No. 63/351,544, filed on Jun. 13, 2022, provisional application No. 63/251,808, filed on Oct. 4, 2021.

(51) Int. Cl.
*A61M 1/00* (2006.01)
*A61B 17/00* (2006.01)
*A61B 17/22* (2006.01)

(52) U.S. Cl.
CPC .............. *A61M 1/76* (2021.05); *A61B 17/22* (2013.01); *A61M 1/73* (2021.05); *A61M 1/79* (2021.05);

(Continued)

(58) Field of Classification Search
CPC ............. A61M 1/76; A61M 1/77; A61M 1/00; A61M 1/70; A61M 1/79; A61M 5/14232;
(Continued)

(56) References Cited

U.S. PATENT DOCUMENTS 4,976,590 A * 12/1990 Baldwin ................. F04B 49/06
417/477.3
5,788,848 A * 8/1998 Blanche ............... B01D 21/003
210/309

(Continued)

FOREIGN PATENT DOCUMENTS

| JP | 2000-140682 A | 5/2000 |
| JP | 2009-063077 A | 3/2009 |

(Continued)

*Primary Examiner* — Philip R Wiest
*Assistant Examiner* — Meagan Ngo
(74) *Attorney, Agent, or Firm* — Morgan, Lewis & Bockius LLP

(57) ABSTRACT

A medical apparatus includes an inflow tube having a first conduit having a first inner diameter. An outflow tube has a second conduit having a second inner diameter. An intermediate tube has a first end and a second end, the first end connected to the inflow tube and the second end connected to the outflow tube. The intermediate tube has a third inner diameter, the third inner diameter being larger than the first inner diameter and the second inner diameter. The intermediate tube defines a flow path. The flow path includes a first flow path configured to direct a liquid flowing along the flow path in a first direction, and a second flow path configured to direct the liquid flowing along the flow path in a second direction. The first direction is opposite to the second direction.

22 Claims, 37 Drawing Sheets

(52) U.S. Cl.
CPC ........... *A61B 2017/00296* (2013.01); *A61B 2017/22079* (2013.01); *A61M 2205/3334* (2013.01); *A61M 2210/1082* (2013.01)

(58) Field of Classification Search
CPC .......... A61M 1/774; A61M 1/71; A61M 1/78; A61B 2017/22079; A61B 2217/005; B01D 45/12; B01D 45/16; B01D 21/267; B01D 45/08; B01D 46/48; B04C 5/185; B04C 3/06; A47L 9/1683; A47L 9/1666; A47L 9/1691; A47L 9/165
See application file for complete search history.

(56) References Cited

U.S. PATENT DOCUMENTS

| | | | | |
|---|---|---|---|---|
| 2006/0173426 | A1* | 8/2006 | Urich | A61M 1/77 604/317 |
| 2009/0066081 | A1 | 3/2009 | Katsura | |
| 2010/0069886 | A1* | 3/2010 | Wilkes | A61M 1/92 604/315 |
| 2011/0257613 | A1* | 10/2011 | Locke | A61M 1/784 604/319 |
| 2014/0236129 | A1* | 8/2014 | Radl | A61B 17/07207 604/540 |
| 2016/0135826 | A1* | 5/2016 | Chadbourne | A61M 1/77 606/127 |
| 2017/0367758 | A1 | 12/2017 | Plascencia, Jr. et al. | |
| 2018/0361055 | A1 | 12/2018 | Pereira et al. | |
| 2019/0008370 | A1 | 1/2019 | Hino | |
| 2019/0133615 | A1* | 5/2019 | Pereira | A61B 17/22 |
| 2020/0397465 | A1* | 12/2020 | Nakano | A61B 17/320758 |
| 2022/0000595 | A1* | 1/2022 | Han | A61C 17/08 |
| 2022/0031519 | A1* | 2/2022 | Hardman | A61M 1/96 |
| 2022/0047283 | A1* | 2/2022 | Baker | A61M 1/60 |

FOREIGN PATENT DOCUMENTS

| | | |
|---|---|---|
| JP | 2013-064349 A | 4/2013 |
| JP | 2016-087589 A | 5/2016 |
| JP | 6275348 B1 | 2/2018 |
| JP | 2020-518342 A | 6/2020 |
| JP | 2020-171885 A | 10/2020 |

* cited by examiner

MEDICAL SOLID-MATTER COLLECTION APPARATUS AND MEDICAL SUCTION SYSTEM

RELATED APPLICATION DATA

This application is based on and claims priority under 35 U.S.C. § 119 to U.S. Provisional Application No. 63/251,808 filed on Oct. 4, 2021, and U.S. Provisional Application No. 63/351,544 filed on Jun. 13, 2022, the entire contents of each are incorporated herein by reference.

FIELD OF THE DISCLOSURE

The present disclosure relates to a medical solid-matter collection apparatus and a medical suction system that are used at the time of suction of a liquid in which a solid matter such as calculus pieces after crushing is mixed.

BACKGROUND

Conventionally, in a medical field, there has been known a procedure in which a calculus is crushed and calculus pieces after the crushing are sucked up and collected using an endoscope.

In such a procedure, calculus pieces having various precipitation properties and floating properties are produced depending on components, compositions and others of the calculus.

As a solid-matter collection apparatus for collecting such calculus pieces, for example, Japanese Patent Application Laid-Open Publication No. 2016-87589 discloses a Y-shaped strainer that includes an inflow portion, an outflow portion and a filtration chamber, that contains a tubular screen body in the filtration chamber such that an inflow side is watertight, and that is provided with a detachable cap body at an opening portion of the filtration chamber.

The Y-shaped strainer is interposed in a liquid suction tube configured to cause a liquid such as a physiological saline solution in a body cavity to flow to a liquid suction pump disposed outside of a body.

The Y-shaped strainer traps (collects) the calculus pieces mixed in the liquid sucked up by the liquid suction pump, at the tubular screen body in the filtration chamber.

SUMMARY OF THE DISCLOSURE

A medical apparatus includes an inflow tube having a first conduit having a first inner diameter. An outflow tube has a second conduit having a second inner diameter. An intermediate tube has a first end and a second end, the first end connected to the inflow tube and the second end connected to the outflow tube. The intermediate tube has a third inner diameter, the third inner diameter being larger than the first inner diameter and the second inner diameter. The intermediate tube defines a flow path. The flow path includes a first flow path configured to direct a liquid flowing along the flow path in a first direction, and a second flow path configured to direct the liquid flowing along the flow path in a second direction. The first direction is opposite to the second direction.

A medical suction system includes an insertion apparatus configured to be inserted into a subject. A suction apparatus is provided outside of the subject and the insertion apparatus and configured to suction a liquid. A medical solid-matter collection apparatus is provided between the insertion apparatus and the suction apparatus. The medical solid-matter collection apparatus includes (i) an inflow tube comprising a first conduit having a first inner diameter, and in fluid communication with the insertion apparatus, (ii) an outflow tube comprising a second conduit having a second inner diameter, and in fluid communication with the suction apparatus, and (iii) an intermediate tube having a first end and a second end, the first end connected to the inflow tube and the second end connected to the outflow tube. The intermediate tube has a third inner diameter, the third inner diameter being larger than the first inner diameter and the second inner diameter. The intermediate tube defines a flow path. The flow path includes a first flow path portion configured to direct a liquid flowing along the flow path in a first direction, and a second flow path configured to direct the liquid flowing along the flow path in second direction. The first direction is opposite to the second direction.

DETAILED DESCRIPTION

Generally, in a Y-shaped strainer interposed in a liquid suction tube, there is concern that clogging of a screen body occurs due to calculus pieces and the like when calculus pieces in a liquid such as a physiological saline solution are trapped by the screen body or the like.

When the clogging of the screen body occurs, the liquid suction performance of a liquid suction pump decreases.

Further, many solid-matter collection apparatuses including the Y-shaped strainer are made from metal. Therefore, the weight is heavy, and the handling when the solid-matter collection apparatus is disposed just near a patient is difficult.

According to embodiments described below, it is possible to provide a medical solid-matter collection apparatus and a medical suction system that do not decrease the liquid suction performance and that is easily handled.

Figure 1:
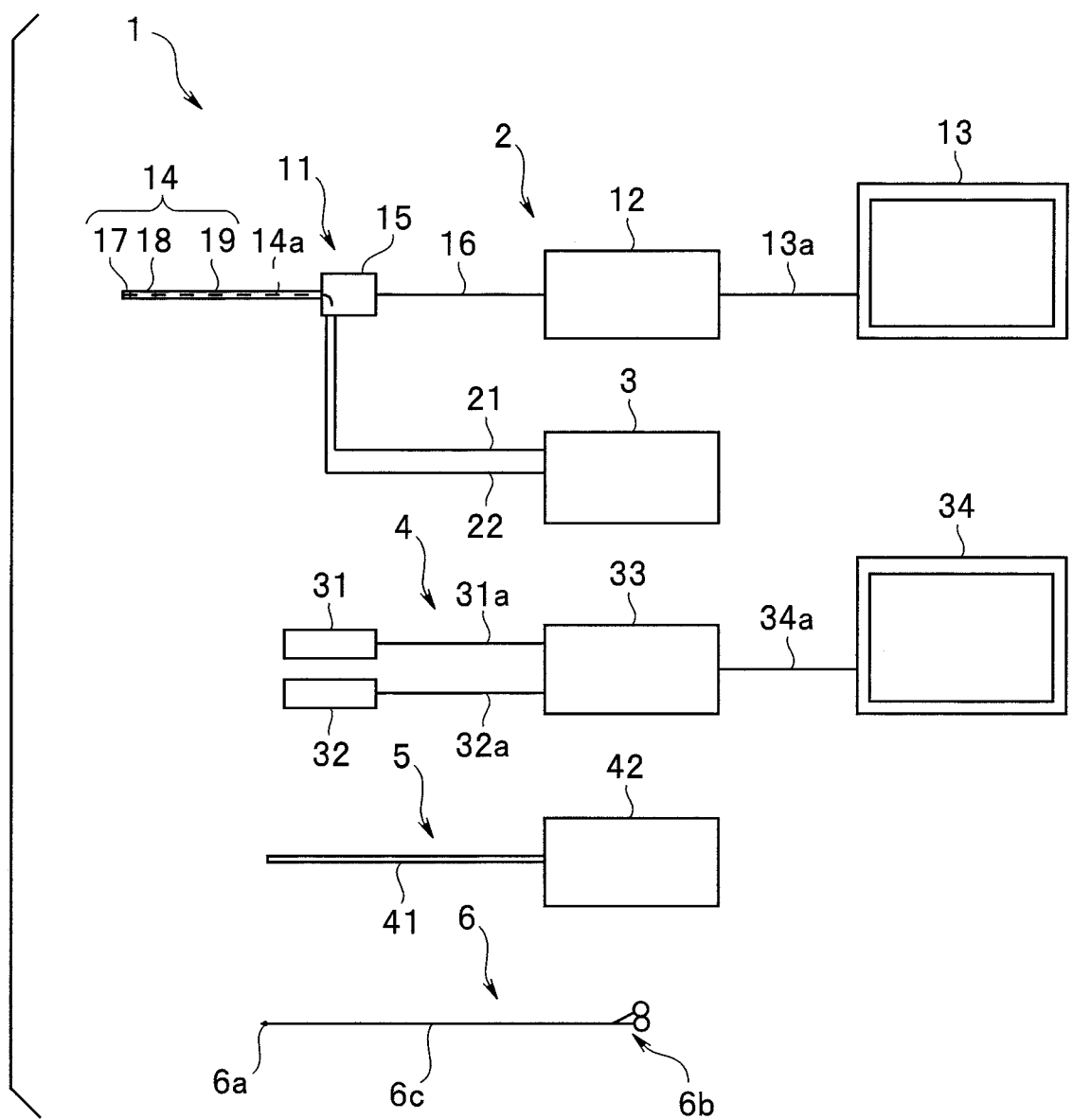
FIG. 1 is a configuration diagram of a medical system according to a first embodiment of the present disclosure.

FIG. 1 is a configuration diagram of a medical system according to a first embodiment of the present disclosure.

For example, a medical system 1 is a system that crushes and removes a kidney calculus (also referred to as merely a calculus, hereinafter) within the kidney of a patient.

The medical system 1 includes an endoscope apparatus 2, a liquid feeding/liquid suction apparatus 3, an X-ray apparatus 4, a laser apparatus 5 and a basket forceps 6.

The endoscope apparatus 2 includes an endoscope 11, a main body apparatus 12 and a monitor 13.

For example, the endoscope 11 is a disposable endoscope.

The endoscope 11 is a soft ureteroscope that includes an insertion portion 14, an operation portion 15 and a connection cable 16.

A connector (not illustrated) is provided at a proximal end portion of the connection cable 16.

The connector can be connected to the main body apparatus 12.

The monitor 13 is connected to the main body apparatus 12 through a cable 13a.

The insertion portion 14 includes a distal end portion 17, a bending portion 18 and a flexible tube portion 19, from a distal end.

Figure 2:
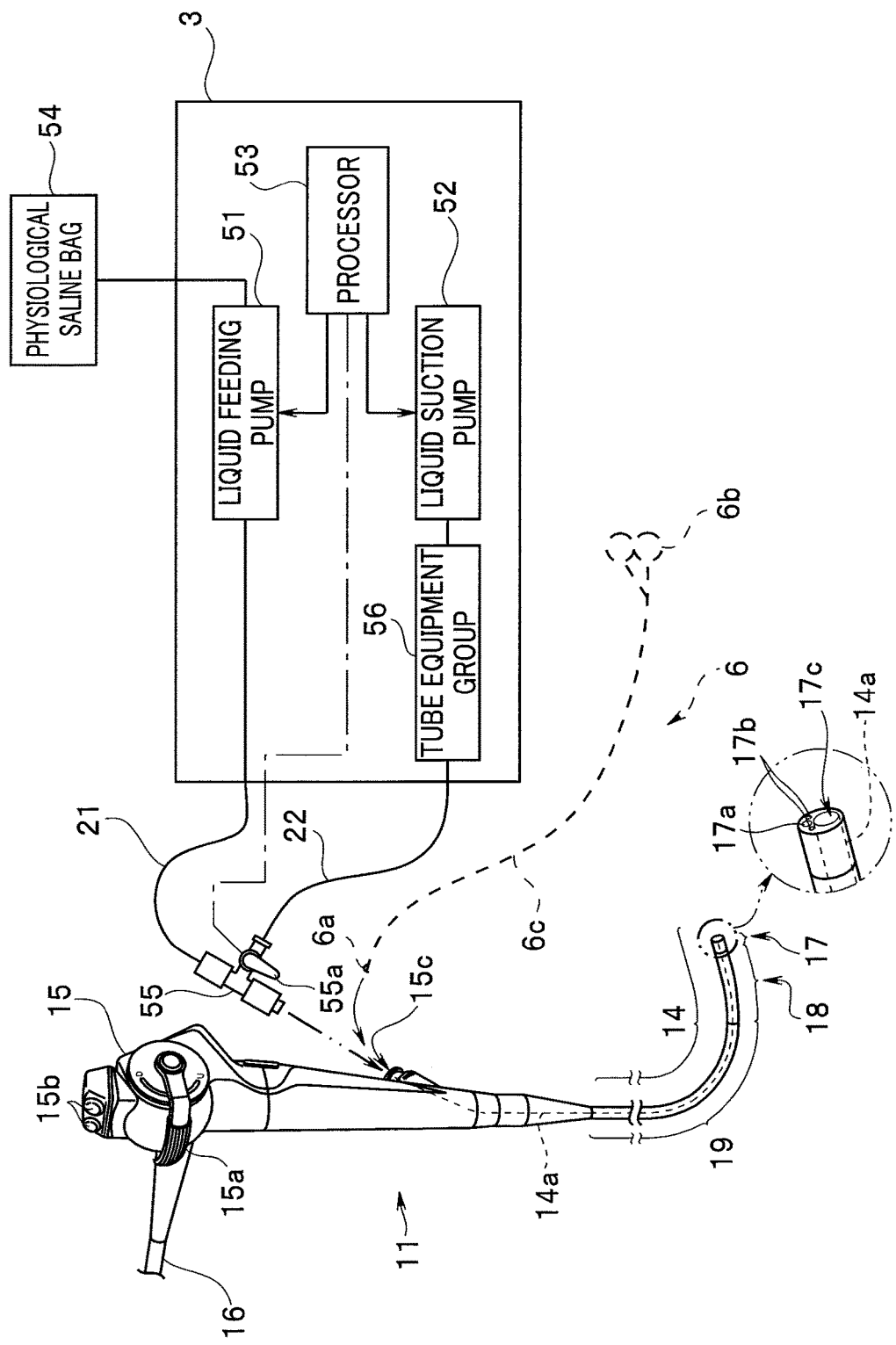
FIG. 2 is a diagram showing a relation between an endoscope and a liquid feeding/liquid suction apparatus according to the first embodiment of the present disclosure.

As shown in FIG. 2 described later, an observation window 17a, an illumination window 17b and a treatment instrument opening 17c are provided on a distal end surface of the distal end portion 17.

Further, the endoscope 11 includes a treatment instrument insertion channel 14a.

An image of a subject that is obtained through the observation window 17a of the distal end portion 17 is displayed on the monitor 13.

An operator operates a bending lever 15a (FIG. 2) at the operation portion 15, while observing an endoscope image of a subject interior that is displayed on the monitor 13.

Thereby, the operator can insert the insertion portion 14 into the subject while bending the bending portion 18, and can check whether the calculus exists.

Further, the operator can execute various functions such as video recording, by operating an operation button 15b (FIG. 2) at the operation portion 15 to which the various functions are assigned.

The liquid feeding/liquid suction apparatus 3 is connected to a liquid feeding tube 21 and a liquid suction tube 22.

As described later, the liquid feeding/liquid suction apparatus 3 is an apparatus configured to feed the physiological saline solution to the liquid feeding tube 21 inserted into the treatment instrument insertion channel 14a of the endoscope 11, and configured to suction the liquid, through the liquid suction tube 22, the physiological saline solution supplied into the subject through the liquid feeding tube 21.

In the physiological saline solution that is sucked up by the liquid suction tube 22, solid matter such as calculus pieces and gas such as air are mixed.

The X-ray apparatus 4 includes an X-ray tube 31, a detector 32, a main body apparatus 33 and a monitor 34.

The X-ray tube 31 and the detector 32 are connected to the main body apparatus 33 through cables 31a, 32a, respectively.

The monitor 34 is connected to the main body apparatus 33 through a cable 34a.

The X-ray tube 31 and the detector 32 are set at positions that make it possible to obtain an X-ray transmission image of organs such as the kidney and urinary duct of the subject on a bed.

An X-ray emitted from the X-ray tube 31 passes through the subject and is received by the detector 32, and a detection signal is outputted to the main body apparatus 33.

The main body apparatus 33 generates the X-ray transmission image based on the detection signal, and outputs an image signal for the generated X-ray transmission image, to the monitor 34.

The laser apparatus 5 includes a laser fiber 41 and a main body apparatus 42.

The laser fiber 41 has a size and shape that allow insertion into the treatment instrument insertion channel 14a of the endoscope 11.

The main body apparatus 42 includes a light source (not illustrated) configured to generate a laser beam, and the generated laser beam can be emitted from a distal end through the laser fiber 41.

The basket forceps 6 is a basket type treatment instrument that includes a basket 6a at a distal end and that includes a handle 6b at a proximal end.

A sheath 6c into which a wire for the basket 6a is inserted is provided between the basket 6a and the handle 6b.

The operator can see the X-ray transmission image displayed on the monitor 34, and can perform various processes such as liquid feeding and the crushing of the calculus with the laser beam while checking positions of the distal end portion 17 of the insertion portion 14 of the endoscope 11, a distal end of the liquid feeding tube 21, a distal end of the laser fiber 41, and others.

FIG. 2 is a diagram showing a connection relation between the endoscope 11 and the liquid feeding/liquid suction apparatus 3.

First, the configuration of the endoscope 11 will be described.

A bending lever 15a is provided at the operation portion 15 of the endoscope 11.

The operator can bend the bending portion 18 in a top-bottom direction by operating the bending lever 15a.

The top-bottom direction corresponds to a top-bottom direction in the endoscope image that is displayed on the monitor 13.

Two operation buttons 15b also are provided at the operation portion 15.

To the respective operation buttons 15b, various functions included in the endoscope 11 can be assigned by the operator that is a user.

Furthermore, a treatment instrument insertion port 15c is provided at the operation portion 15 of the endoscope 11.

The treatment instrument insertion port 15c is continuous with the treatment instrument insertion channel 14a in the insertion portion 14.

The observation window 17a, the illumination window 17b and the treatment instrument opening 17c are provided on the distal end surface of the distal end portion 17 of the endoscope 11.

An illumination light is emitted from the illumination window 17b.

A reflected light of the illumination light from an observation site in the subject enters the observation window 17a.

The light having entered the observation window 17a enters an image pickup surface of an image pickup device (not illustrated) disposed on a backside of the observation window 17a.

An image pickup signal from the image pickup device is supplied to the main body apparatus 12 through signal lines inserted into the insertion portion 14, the operation portion 15 and the connection cable 16.

The treatment instrument insertion port 15c of the operation portion 15 communicates with the treatment instrument opening 17c of the distal end portion 17 through the treatment instrument insertion channel 14a.

The treatment instrument insertion port 15c is an opening into which a treatment instrument is inserted, and can be connected to a T-tube 55.

The operator can alter a route of flow of the liquid in the T-tube 55, by operating a lever 55a of the T-tube 55.

Note that the T-tube 55 may be able to control switching of the lever 55a configured to control a direction of the flow of the liquid in the T-tube 55 based on a control signal from a processor 53 described later, as shown by a one-dot chain line.

Next, the configuration of the liquid feeding/liquid suction apparatus 3 will be described.

The liquid feeding/liquid suction apparatus 3 includes a liquid feeding pump 51, a liquid suction pump 52 as a suction apparatus, and the processor 53.

The liquid feeding pump 51 is connected to a physiological saline bag 54 in which the physiological saline solution is retained.

The liquid feeding/liquid suction apparatus 3 includes an unillustrated operation panel, and the operator can execute a desired function such as start of liquid feeding, by operating the operation panel.

The liquid feeding pump 51 and the liquid suction pump 52 are connected to the processor 53.

The liquid feeding pump 51 and the liquid suction pump 52 can operate under the control by the processor 53.

A proximal end portion of the liquid feeding tube 21 is connected to the liquid feeding pump 51. A proximal end portion of the liquid suction tube 22 is connected to the liquid suction pump 52.

Furthermore, a tube equipment group 56 described later is interposed at a midway portion of the liquid suction tube 22.

In the present embodiment, for example, the liquid suction pump 52 is constituted by a tube pump configured to suction the liquid in the liquid suction tube 22 with rotation of a rotor 52a.

A distal end portion of the liquid feeding tube 21 can be inserted into the treatment instrument insertion channel 14a from one port of the T-tube 55.

A distal end portion of the liquid suction tube 22 can be connected to another port of the T-tube 55.

The other one port of the T-tube 55 can be connected to the treatment instrument insertion port 15c of the endoscope 11.

Thereby, in the present embodiment, the liquid suction tube 22 constitutes a liquid suction conduit, together with the treatment instrument insertion channel 14a.

Further, in the present embodiment, the liquid suction conduit constitutes a medical suction system, together with the liquid-suction pump 52, the tube equipment group 56 and the like.

Note that after the operator removes the liquid feeding tube 21, the operator can insert the basket forceps 6 into the treatment instrument insertion channel 14a through the T-tube 55.

The processor 53 includes a central processing unit (CPU), a ROM, a RAM and the like.

The CPU loads predetermined control programs recorded in the ROM onto the RAM and executes the predetermined control programs, in response to commands that are inputted to the operation panel by the operator.

Thereby, various functions of the liquid feeding/liquid suction apparatus 3 are realized.

For example, the processor 53 feeds the physiological saline solution from the physiological saline bag 54 into a lumen of the liquid feeding tube 21 through the operation control of the liquid feeding pump 51.

Further, the processor 53 sucks up the liquid in the treatment instrument insertion channel 14a through the liquid suction tube 22 through the operation control of the liquid suction pump 52.

Figure 3:
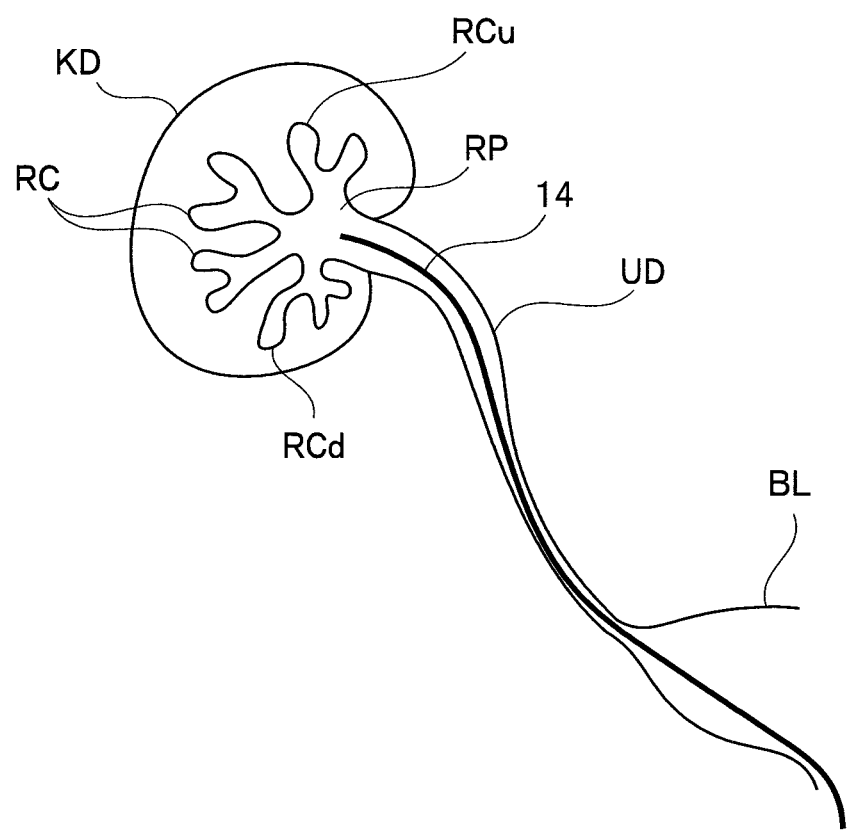
FIG. 3 is a diagram for describing a path to a kidney into which an insertion portion of the endoscope is inserted according to the first embodiment of the present disclosure.

FIG. 3 is a diagram for describing a path to a kidney KD into which the insertion portion 14 of the endoscope 11 is inserted.

The insertion portion 14 is inserted from an unillustrated urethra.

The insertion portion 14 can cause a distal end portion of the insertion portion 14 to pass through a bladder BL and a urinary duct UD and to reach an interior of the kidney KD.

The kidney KD includes a renal pelvis RP.

The kidney KD further includes a plurality of renal calices RC branching from the renal pelvis RP.

The renal pelvis RP has a wider space than the renal calices RC.

The renal calices RC are lumen erasure portions of the kidney KD.

The operator can insert the distal end portion 17 of the insertion portion 14 of the endoscope 11 into each renal calix RC through the renal pelvis RP, while seeing the X-ray transmission image displayed on the monitor 34.

Figure 4:
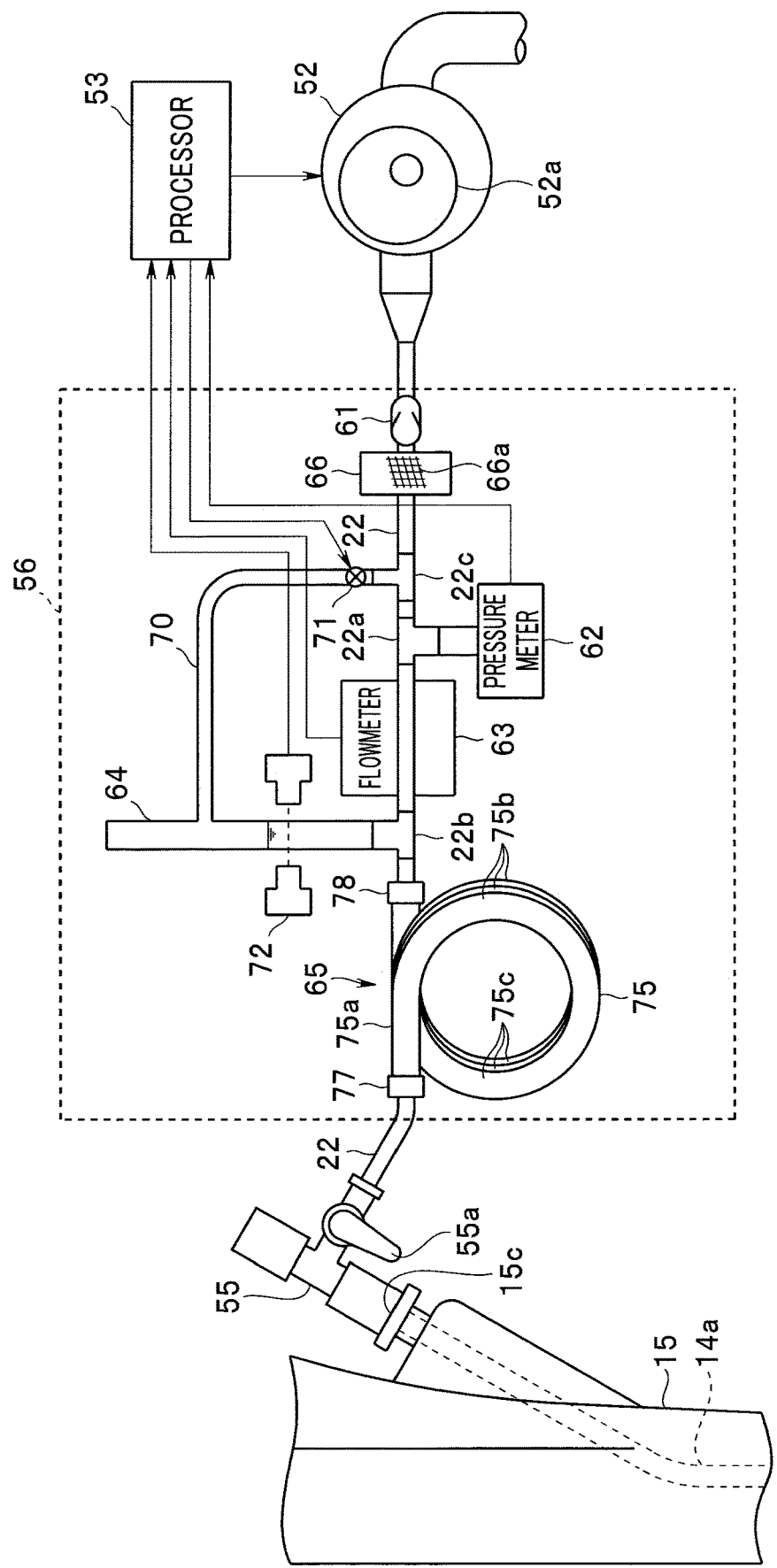
FIG. 4 is a configuration diagram of a medical suction system according to the first embodiment of the present disclosure.

FIG. 4 is a diagram for describing the tube equipment group 56 that is interposed at the midway portion of the liquid suction tube 22 (liquid suction conduit).

As tube equipment that is interposed at the midway portion of the liquid suction tube 22, the tube equipment group 56 in the present embodiment includes a check valve 61, a pressure meter 62, a flowmeter 63, an air chamber 64, and a solid-matter collection apparatus 65 that is a medical solid-matter collection apparatus, in an order from a liquid suction pump 52 side that is a downstream side.

Furthermore, when appropriate, as the tube equipment, the tube equipment group 56 can include a filtration apparatus 66 such as a strainer that is interposed at the midway portion of the liquid suction tube 22, on a downstream side of the solid-matter collection apparatus 65.

The filtration apparatus 66 incorporates a filter 66a composed of a metal mesh or the like.

For example, the filtration apparatus 66 (in other words, the filter 66a) can be disposed between the check valve 61 and the pressure meter 62. The filter apparatus 66 and the filter 66a may be provided between the intermediate tube 75 and the liquid suction pump 52.

The check valve 61 is a valve body configured to permit the liquid inside the liquid suction tube 22 to flow from the T-tube 55 side to the liquid suction pump 52 side and to prohibit the flow thereof from the liquid suction pump 52 side to the T-tube 55 side.

The pressure meter 62 is connected to a midway portion of the liquid suction tube 22 through a T-joint 22a.

The pressure meter 62 detects the pressure of the liquid that flows through the liquid suction tube 22.

A midway portion of the liquid suction tube 22 is inserted into the flowmeter 63.

For example, the flowmeter 63 is an ultrasonic flowmeter.

The flowmeter 63 measures the flow rate of the liquid that flows through the liquid suction tube 22, in a state where the flowmeter 63 does not contact with the liquid. The flowmeter 63 is provided between the endoscope 11 and the liquid suction pump 52 on a downstream side of the medical solid-matter collection apparatus 65. The flowmeter 63 is configured to measure a flow rate of the liquid that flows through one of more of the inflow tube and the outflow tube.

The pressure and flow rate of the liquid that are detected by the pressure meter 62 and the flowmeter 63 are inputted to the processor 53.

For example, the processor 53 performs a feedback control for the liquid suction pump 52, based on measurement values of the pressure and flow rate of the liquid.

Thereby, the pressure and flow rate of the liquid that flows through an interior of the liquid suction tube 22 are maintained at predetermined values.

The air chamber 64 is connected to a midway portion of the liquid suction tube 22 through a T-joint 22b.

For example, the air chamber 64 is disposed so as to be oriented to a perpendicular-directional upper side of the liquid suction tube 22 (in a reverse direction of a gravity direction).

Thereby, air is retained at an upper portion in the air chamber 64.

The air chamber 64 absorbs the flow ripple of the liquid that flows through the interior of the liquid suction tube 22, into the air that is retained in an interior of the air chamber 64.

Thereby, the flow ripple generated in the liquid within the liquid suction tube 22 by the liquid suction pump 52 is damped. The air chamber 64 is provided between the medical solid-matter collection apparatus 65 and the flowmeter 63.

Further, the air chamber 64 in the present embodiment also has a function to trap the air mixed in the liquid.

By providing the air chamber 64 on an upstream side of the flowmeter 63, it is possible to remove the air from the liquid that is flowing through an interior of the flowmeter 63.

Accordingly, the decrease in the measurement performance of the flowmeter 63 disposed on a downstream side of the air chamber 64 is restrained.

Note that the upstream and downstream herein are defined based on the direction of the flow of the liquid from the distal end of the endoscope 11 to the liquid suction pump 52.

In other words, the distal end side of the endoscope 11 is the upstream, and the liquid suction pump 52 side is the downstream.

Meanwhile, the air retained in the air chamber 64 increases whenever the air in the liquid is trapped.

Then, when the air retained in the air chamber 64 overflows beyond the capacity of the air chamber 64, there is concern of the decrease in the measurement performance of the flowmeter 63.

Specifically, there is concern that the flow rate of the liquid measured by the flowmeter 63 becomes a lower value than an actual flow rate of the liquid due to the influence of the air having overflowed in the liquid.

Then, when a lower value than the actual flow rate of the liquid is measured, the liquid suction pump 52 is driven earlier than necessary, due to the feedback control by the processor 53, so that the flow rate of the liquid that flows through the liquid-suction tube 22 becomes excessively high.

Hence, for preventing the overflow of the air before happens and improving the controllability of the liquid suction pump 52, the air chamber 64 is connected to one end of a leak passage 70.

The other end of the leak passage 70 is connected to a midway portion of the liquid suction tube 22 through a T-joint 22c, on a downstream side of the flowmeter 63 and the pressure meter 62.

Further, a leak valve 71 is interposed at a midway portion of the leak passage 70.

For example, the leak valve 71 is a normally closed magnetic valve configured to be controlled and opened by the processor 53.

For performing the opening control of the leak valve 71, a liquid level sensor 72 is provided in the air chamber 64.

For example, the liquid level sensor 72 is an optical sensor configured to be turned on when the amount of the air in the air chamber 64 increases and a liquid level in the air chamber 64 becomes lower than a set height.

An on-signal of the liquid level sensor 72 is inputted to the processor 53.

When the on-signal of the liquid level sensor 72 is inputted, the processor 53 opens the leak valve 71 for a previously set time period.

Thereby, some of the air retained in the air chamber 64 bypasses the flowmeter 63 and the pressure meter 62, and is discharged in the liquid suction tube 22 on the downstream side of the flowmeter 63 and the pressure meter 62.

As shown in FIGS. 4 to 7, the solid-matter collection apparatus 65 includes a intermediate tube 75 as a tube that is interposed at a midway portion of the liquid suction tube 22, and a tube holder 76 configured to fix and hold the intermediate tube 75 in a previously set shape.

For example, the intermediate tube 75 is constituted by a resin tube having softness.

For example, the intermediate tube 75 is a disposable article.

One end of the intermediate tube 75 is set as a liquid inflow portion 75d configured to cause the liquid to flow into the intermediate tube 75 from the liquid suction tube 22.

The one end of the intermediate tube 75 is connected to a midway portion of the liquid suction tube 22 through a first connector 77 that is a connector.

In other words, the first connector 77 includes a stepped through-hole 77a into which the intermediate tube 75 and the liquid suction tube 22 can be inserted.

The one end of the intermediate tube 75 and an end portion on an upstream side of the midway portion of the liquid suction tube 22 are inserted into the through-hole 77a, and thereby the one end of the intermediate tube 75 is connected to the midway portion of the liquid suction tube 22 such that disconnection can be performed.

An inflow tube comprises at least one of the liquid suction tube 22, the first connector 77, the T-tube 55 and the treatment instrument insertion port 15c.

Further, the other end of the intermediate tube 75 is set as a liquid outflow portion 75e configured to cause the liquid to flow out of the intermediate tube 75 to the liquid suction tube 22.

The other end of the intermediate tube 75 is connected to a midway portion of the liquid suction tube 22 through a second connector 78 that is a connector.

In other words, the second connector 78 includes a stepped through-hole 78a into which the intermediate tube 75 and the liquid suction tube 22 can be inserted.

The other end of the intermediate tube 75 and an end portion on a downstream side of the midway portion of the liquid suction tube 22 are inserted into the through-hole 78a, and thereby the other end of the intermediate tube 75 is connected to the midway portion of the liquid suction tube 22 such that disconnection can be performed.

An outflow tube comprises at least one of the second connector 78, the liquid suction tube 22 and the leak passage 70.

The intermediate tube 75 is formed such that the inner diameter of at least a partial region is larger than the inner diameter of the liquid suction tube 22 that is connected to the first connector 77.

In the present embodiment, the intermediate tube 75 is formed such that the inner diameter of the whole region is larger than the inner diameter of the liquid suction tube 22 that is connected to the first connector 77.

In other words, the intermediate tube 75 in the present embodiment is set as a large-diameter portion 75a in which the inner diameter of the whole region is larger than the inner diameter of the liquid suction tube 22 that is connected to the first connector 77.

Figure 5:
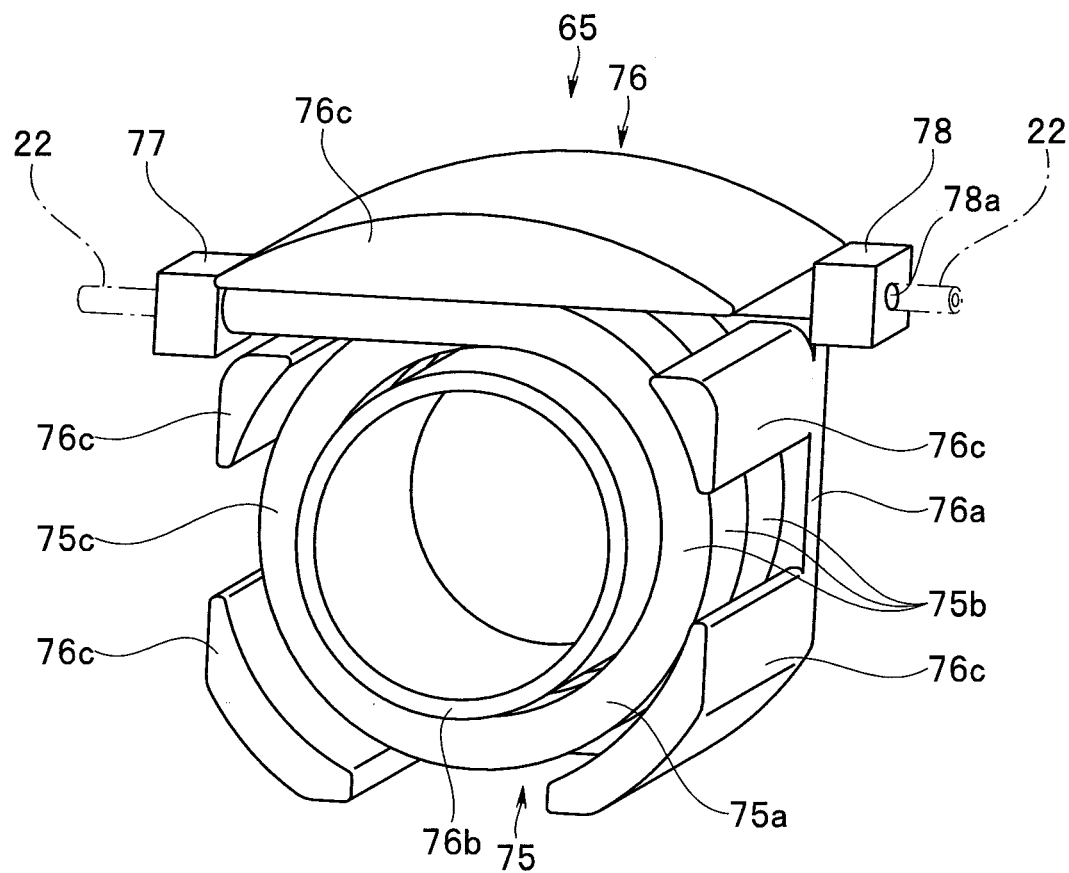
FIG. 5 is a perspective view showing a medical solid-matter collection apparatus according to the first embodiment of the present disclosure.
Figure 6:
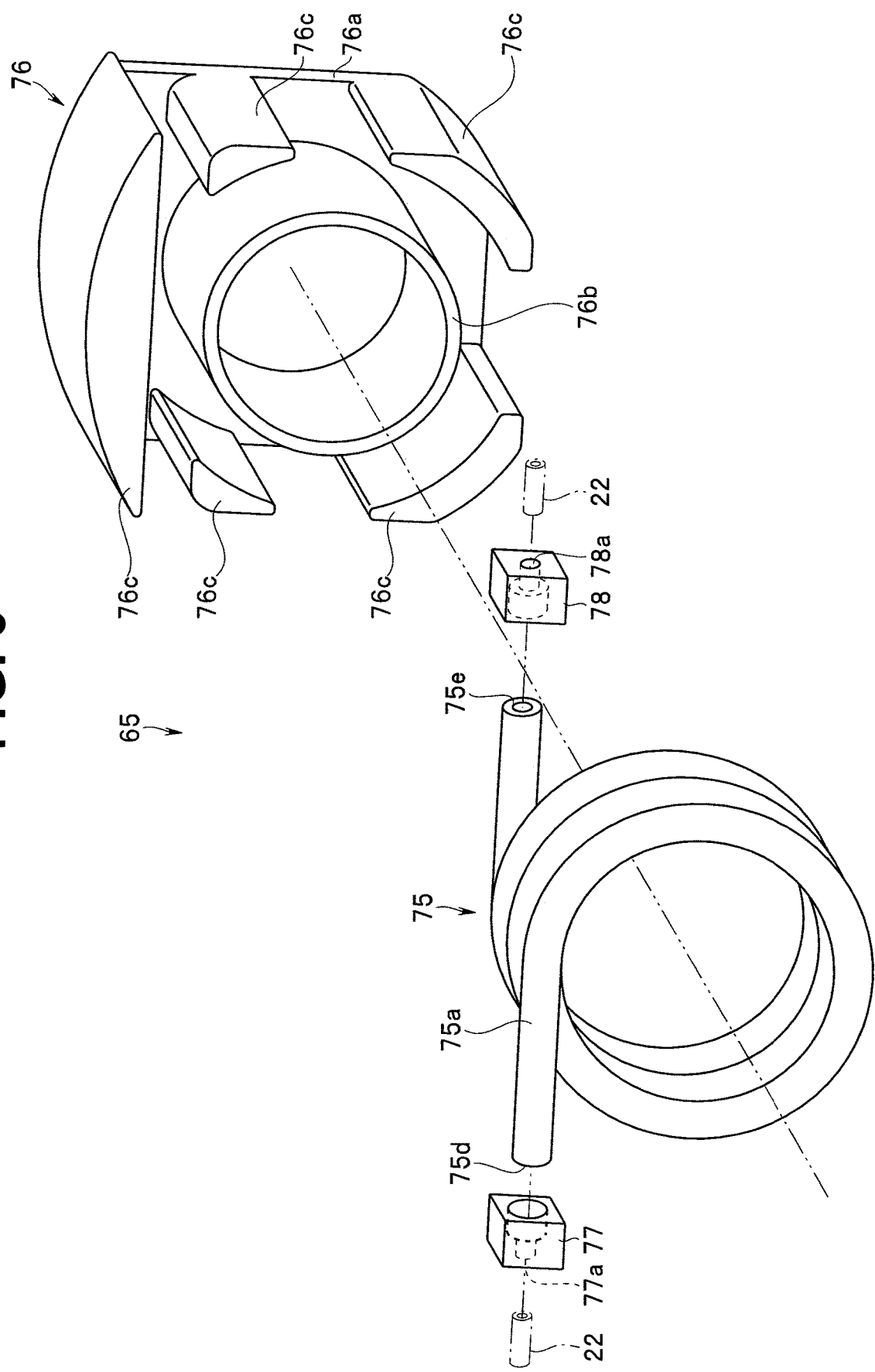
FIG. 6 is an exploded perspective view showing the medical solid-matter collection apparatus according to the first embodiment of the present disclosure.

As shown in FIGS. 5 and 6, for example, the tube holder 76 is configured to include a tabular holder main body 76a, a cylindrical bobbin 76b projecting from the holder main body 76a, and a plurality of guide members 76c projecting from the holder main body 76a so as to surround a periphery of the bobbin 76b.

For example, the holder main body 76a, the bobbin 76b and the guide members 76c are integrally formed by resin molding.

The intermediate tube 75 is wound around the bobbin 76b of the tube holder 76, about three times, for example.

The intermediate tube 75 wound around the bobbin 76b is held in an interspace between the bobbin 76b and the respective guide members 76c.

In other words, the intermediate tube 75 is fixed to the tube holder 76, in a state where the intermediate tube 75 has been swirled around the periphery of the bobbin 76b three times.

On that occasion, for example, the intermediate tube 75 is fixed to the tube holder 76, such that one end side connected to the first connector 77 and the other end side connected to the second connector 78 are in mutually reverse directions.

In other words, the intermediate tube 75 in the present embodiment is fixed to the tube holder 76 so as to draw a circular arc in which an angle between a central axis of the liquid inflow portion 75d and a central axis of the liquid outflow portion 75e is 108 degrees.

In this way, in the present embodiment, the large-diameter portion 75a of the intermediate tube 75 forms a loop portion.

Among the plurality of guide members 76c, previously set guide members 76c (for example, two mutually adjacent guide members 76c) further have a function as a stand configured to cause the tube holder 76 to rise up on a table or the like.

Note that in the present embodiment, the state where the tube holder 76 has risen up means, for example, a state where the holder main body 76a is perpendicular to the table or the like and where a central axis of the bobbin 76b is horizontal to the table or the like.

By holding the tube holder 76 in the state where the tube holder 76 has risen up in this way, the one end side and the other end side of the intermediate tube 75 are disposed on an upper side of the tube holder 76, so as to be horizontal to a floor surface.

Furthermore, by holding the tube holder 76 in the state where the tube holder 76 has risen up, a first path 75b and a second path 75c are formed in the large-diameter portion 75a of the intermediate tube 75 wound around the bobbin 76b.

The first path 75b is a path configured to cause the liquid flowing from the liquid inflow portion 75d to the liquid outflow portion 75e to fall in the gravity direction instead of a horizontal direction.

The second path 75c is a path configured to cause the liquid flowing from the liquid inflow portion 75d to the liquid outflow portion 75e to rise in a reverse direction of the gravity direction.

Note that the tube holder 76 may be hung at a midway portion of the conduit instead of being placed on the table or the like.

Alternatively, the tube holder 76 may be installed such that a surface (a back surface side in FIG. 5) perpendicular to the bobbin 76b is fixed at a place such as a wall, a housing of the pump, or an endoscope trolley.

A reason why the solid matter such as calculus pieces can be trapped by the intermediate tube 75 of the solid-matter collection apparatus 65 will be described with reference to a Hjulstrom diagram (see FIG. 8) showing a relation of erosion, deposition and transport of earth and sand at a river.

Figure 8:
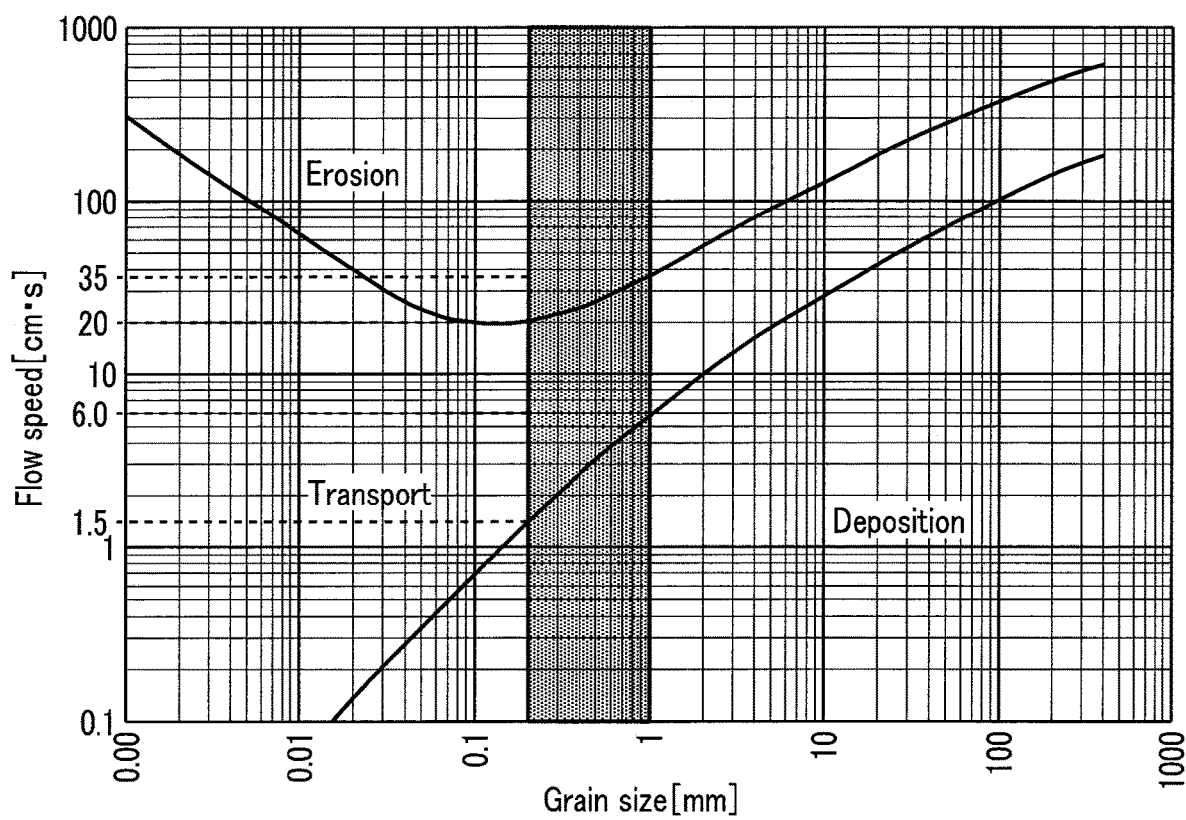
FIG. 8 is an explanatory diagram showing a Hjulstrom diagram according to the first embodiment of the present disclosure.

The Hjulstrom diagram shown in FIG. 8 shows an erosion flow speed region, a transport flow speed region and a deposition flow speed region of liquid in a relation with the grain size of the solid matter.

The erosion flow speed region is a flow speed region of the liquid in the conduit, and corresponds to a flow speed region in which the deposited solid matter starts to flow.

The transport flow speed region is a flow speed region of the liquid in the conduit, and corresponds to a flow speed region in which the solid matter flows without deposition.

The deposition flow speed region is a flow speed region of the liquid in the conduit, and corresponds to a flow speed region in which the flowing solid matter is deposited.

A flow speed at which the solid matter that is a collection object and that has an average size (in a range of 0.2 mm to 1.0 mm, for example), as exemplified by calculus pieces, starts to flow will be discussed with reference to the Hjulstrom diagram.

For example, for a solid matter having a grain size of 0.2 mm, the flow speed at a border between the transport and the deposition is 15 mm/s, and the flow speed at a border between the transport and the erosion is 200 mm/s.

Accordingly, in order that the solid matter deposited once flows again, the flow speed needs to increase about 13.3 times.

The flow speed (average cross-sectional flow speed) of the flow in the conduit is inversely proportional to a conduit cross-sectional area, and therefore, when the inner diameter of the conduit decreases 1/3.6 times, the solid matter deposited once flows again.

Further, for a solid matter having a grain size of 1.0 mm, the flow speed at a border between the transport and the deposition is 60 mm/s, and the flow speed at a border between the transport and the erosion is 350 mm/s.

Accordingly, in order that the solid matter deposited once flows again, the flow speed needs to increase about 5.8 times.

The flow speed (average cross-sectional flow speed) of the flow in the conduit is inversely proportional to the conduit cross-sectional area, and therefore, when the inner diameter of the conduit decreases 1/2.4 times, the solid matter deposited once flows again.

For realizing the changes in flow speed, it is desirable that an inner diameter ratio of approximately 2 or more should be set between the liquid suction tube 22 that is connected to the first connector 77 and the large-diameter portion 75a of the intermediate tube 75.

Such a setting gives an effect of introducing crushed calculus pieces having sizes for collection object into the solid-matter collection apparatus 65 without depositing the calculus pieces in the liquid suction tube 22 on an upstream side of the solid-matter collection apparatus 65, and depositing (trapping) the calculus pieces in an interior of the intermediate tube 75.

For example, assuming that an expected average flow rate range for the liquid suction pump 52 is within 50 ml/min, examples of experimental results about the inner diameter of the intermediate tube 75 and a behavior of crushed calculus pieces are shown as follows.

Note that the diameter of the loop portion of the intermediate tube 75 (large-diameter portion 75a) in the experiment was roughly 100 mm or less.

For example, in the case where the inner diameter of the intermediate tube 75 was 4 mm, it was recognized that some of the calculus pieces flowed to the downstream side beyond the loop portion when the flow rate of the liquid became high (when the average flow rate came close to 50 ml/min).

Note that in the intermediate tube 75 having this inner diameter, it was recognized that the air mixed in the liquid flowed to the downstream side beyond the loop portion of the intermediate tube 75.

For example, in the case where the inner diameter of the intermediate tube 75 was 5 mm, it was recognized that the calculus pieces did not flow to the downstream side beyond the loop portion even when the flow rate of the liquid became high (even when the average flow rate came close to 50 ml/min).

Note that in the intermediate tube 75 having this inner diameter, it was recognized that the air mixed in the liquid stayed at a bubble adherence level.

For example, in the case where the inner diameter of the intermediate tube 75 was 6 mm, it was recognized that the calculus pieces did not flow to the downstream side beyond the loop portion even when the flow rate of the liquid became high (even when the average flow rate came close to 50 ml/min).

Note that in the intermediate tube 75 having this inner diameter, it was recognized that the air mixed in the liquid stayed at an upper portion of the loop portion in large amounts.

Based on the above results, in the present embodiment, as an example, the inner diameter of the liquid suction tube 22 that is connected to the first connector 77 is set to 3 mm or less. In the case of this example, the inner diameter of the large-diameter portion 75*a* of the intermediate tube 75 is set to 5 mm or more, and preferably should be set to 6 mm or more, for example.

Note that the inner diameter dimension can naturally be altered when appropriate depending on the size of calculus pieces to be trapped, the capability of the liquid suction pump 52, and the like.

Further, the inner diameter of the liquid suction tube 22 that is connected to the second connector 78 is not particularly limited.

In the medical system 1 having this configuration, when the liquid suction pump 52 is driven after various processes such as the liquid feeding of the liquid such as the physiological saline solution into the kidney KD or the like and the crushing of the calculus by the laser beam are performed using the endoscope apparatus 2, the liquid such as the physiological saline solution containing calculus pieces is sucked out of a body cavity (kidney KD) through the treatment instrument insertion channel 14*a*.

When the liquid sucked out of the body cavity flows into the intermediate tube 75 of the solid-matter collection apparatus 65 from the liquid suction tube 22, the liquid reaches the large-diameter portion 75*a* and the flow speed rapidly decreases.

Figure 9:
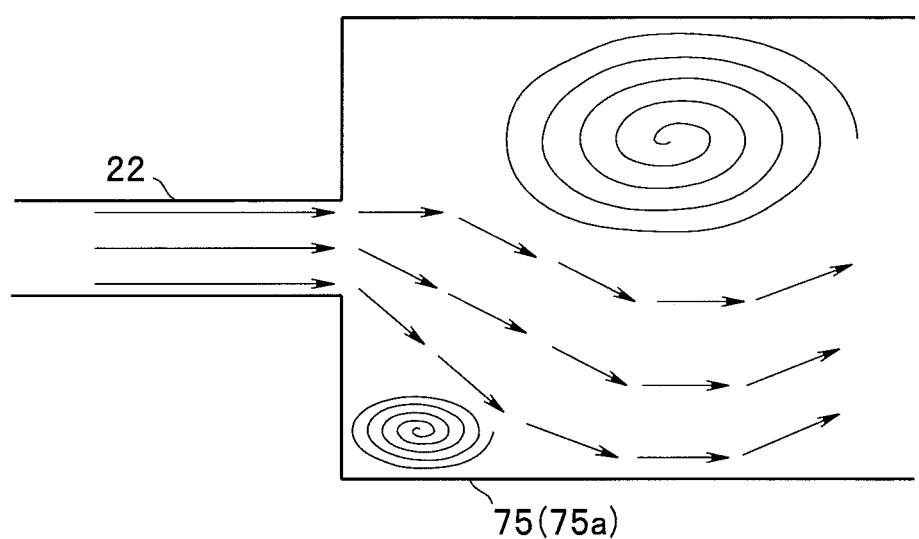
FIG. 9 is an explanatory diagram showing a behavior of a liquid in an interior of the medical solid-matter collection apparatus according to the first embodiment of the present disclosure.

On that occasion, the effective area of the conduit rapidly changes at the large-diameter portion 75*a*, and thereby a vortex flow is generated in an interior of the large-diameter portion 75*a* (see FIG. 9).

Figure 7:
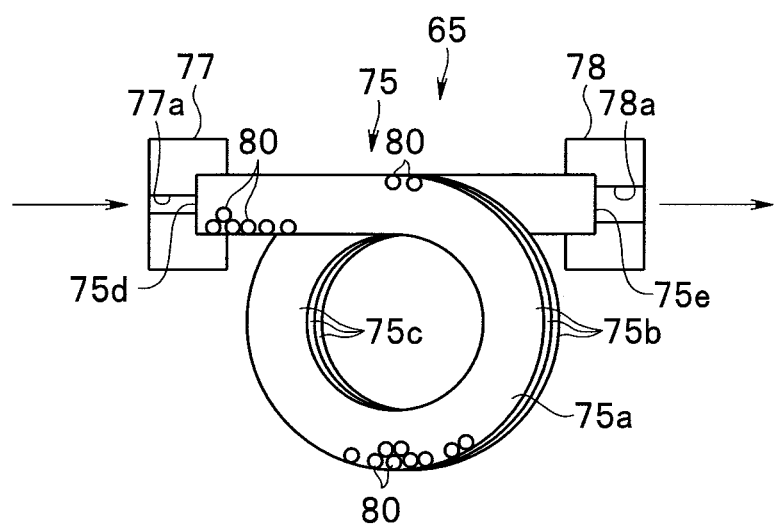
FIG. 7 is a schematic view showing a principal part of the medical solid-matter collection apparatus according to the first embodiment of the present disclosure.

Because of the rapid change in the flow speed of the liquid having reached the large-diameter portion 75*a* and the generation of the vortex flow, some solid matter 80 that is of the solid matter 80 such as calculus pieces contained in the liquid and that has a higher specific gravity than the liquid precipitates, and is trapped in the intermediate tube 75 (see FIG. 7).

Further, when the liquid proceeds in the interior of the large-diameter portion 75*a*, the liquid moves downward in the gravity direction, at the first path 75*b*.

On that occasion, the solid matter 80 that is of the solid matter 80 contained in the liquid and that has a lower specific gravity than the liquid remains near an inlet of the first path 75*b* without moving downward in the gravity direction, and is trapped in the intermediate tube 75.

Furthermore, when the liquid proceeds in the interior of the large-diameter portion 75*a*, the liquid shifts from the first path 75*b* to the second path 75*c*.

On that occasion, the solid matter 80 that is of the solid matter 80 contained in the liquid and that has a higher specific gravity than the liquid precipitates near a border between the first path 75*b* and the second path 75*c* without moving in the reverse direction of the gravity direction together with the liquid, and is trapped in the intermediate tube 75.

Thereby, most of the solid matter 80 contained in the liquid is trapped in the interior of the intermediate tube 75.

Note that even if some of the solid matter 80 contained in the liquid is not collected in the solid-matter collection apparatus 65 and flows out of the liquid outflow portion 75*e* into the liquid suction tube 22 in small amounts, the flowing solid matter 80 is adequately trapped by the filter 66*a* of the filtration apparatus 66.

In this case, the amount of the solid matter such as calculus pieces that remains in the liquid having passed through the solid-matter collection apparatus 65 is small.

Accordingly, clogging of the filter 66*a* in the filtration apparatus 66 is prevented.

According to such an embodiment, the solid-matter collection apparatus 65 includes: the intermediate tube 75 interposed in the liquid suction tube 22 configured to cause the liquid in which the solid matter is mixed, to flow to the liquid suction pump 52 disposed outside of the subject; the liquid inflow portion 75*d* provided at one end of the intermediate tube 75 and configured to cause the liquid to flow into the intermediate tube from the liquid suction tube 22; the liquid outflow portion 75*e* provided at the other end of the intermediate tube 75 and configured to cause the liquid to flow out of the intermediate tube 75 to the liquid suction tube 22; the large-diameter portion 75*a* provided in the intermediate tube 75 between the liquid inflow portion 75*d* and the liquid outflow portion 75*e* and formed so as to have an inner diameter larger than the inner diameter of the liquid suction tube 22 that is connected to the liquid inflow portion 75*d*; the first path 75*d* formed in the large-diameter portion 75*a* and configured to cause the liquid flowing from the liquid inflow portion 75*d* to the liquid outflow portion 75*e* to fall in the gravity direction; and the second path 75*c* formed in the large-diameter portion 75*a* and configured to cause the liquid flowing from the liquid inflow portion 75*d* to the liquid outflow portion 75*e* to rise in the reverse direction of the gravity direction.

By this configuration, it is possible to provide the solid-matter collection apparatus 65 that does not decrease the liquid suction performance of the liquid suction pump 52 and that is easily handled.

In other words, the solid-matter collection apparatus 65 in the present embodiment employs a configuration of trapping the solid matter such as calculus pieces contained in the liquid by causing the liquid to fall in the gravity direction and further causing the liquid to rise in the reverse direction of the gravity direction after reducing the flow speed of the liquid flowing from the liquid suction tube 22 to the intermediate tube 75.

Accordingly, unlike a configuration of trapping the solid matter using a filter such as a screen body, clogging and the like do not occur, and it is possible to prevent the decrease in the liquid suction performance of the liquid suction pump 52.

Further, the solid-matter collection apparatus 65 in the present embodiment employs a configuration of using no filter, and can use lightweight resin for the intermediate tube 75, the tube holder 76 and the like.

Accordingly, it is possible to achieve the reduction in the weight of the solid-matter collection apparatus 65, resulting in an easy handling.

In this case, particularly, the large-diameter portion 75a of the intermediate tube 75 includes a loop portion that leads the liquid from the liquid inflow portion 75d to the liquid outflow portion 75e after swirling the liquid from the liquid inflow portion 75d (more specifically, three times).

Accordingly, the intermediate tube 75 can more adequately trap the solid-matter contained in the liquid.

Further, the intermediate tube 75 can be attached to and detached from the liquid suction tube 22, by the first connector 77 and the second connector 78.

Accordingly, when a biological test or the like of the solid matter such as calculus pieces trapped in the intermediate tube 75 is performed, it is possible to easily take out the solid matter such as the calculus from the solid-matter collection apparatus 65.

Figure 10:
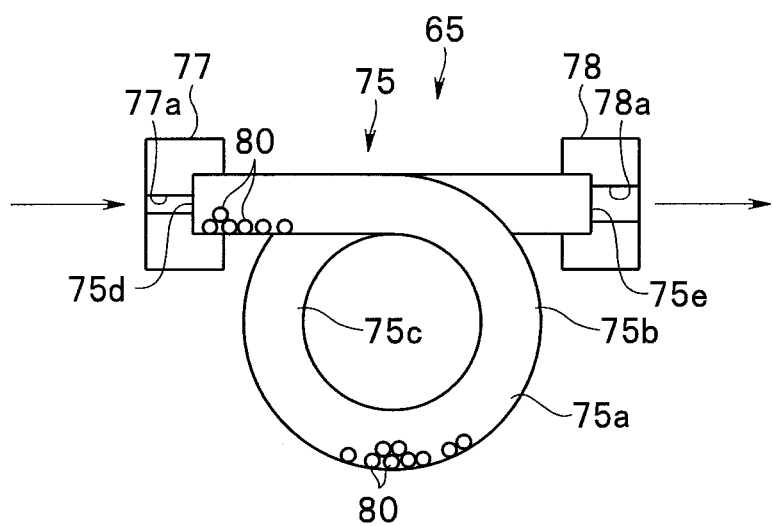
FIG. 10 is a schematic diagram showing a principal part of a medical solid-matter collection apparatus according to a first modification of the first embodiment of the present disclosure.

For example, as shown in FIG. 10, the intermediate tube 75 may adopt a configuration in which the large-diameter portion 75a is swirled one time.

In other words, the intermediate tube 75 in a modification shown in FIG. 10 is fixed so as to draw a circular arc in which the angle between the central axis of the liquid inflow portion 75d and the central axis of the liquid outflow portion 75e is 360 degrees.

Figure 11:
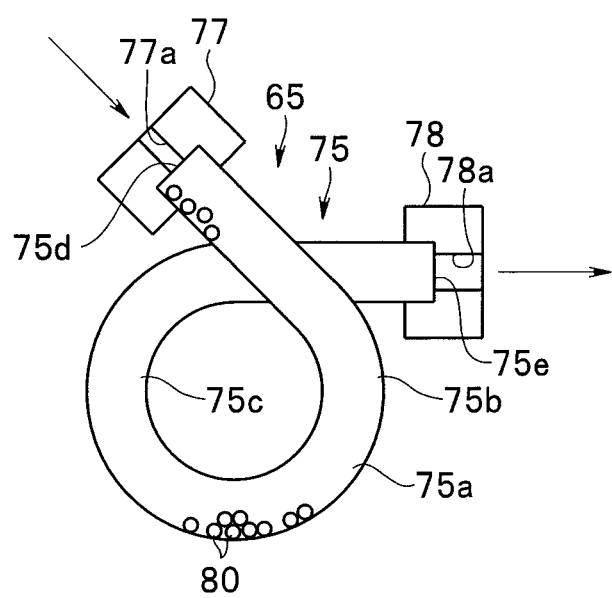
FIG. 11 is a schematic diagram showing a principal part of a medical solid-matter collection apparatus according to a second modification of the first embodiment of the present disclosure.
Figure 12:
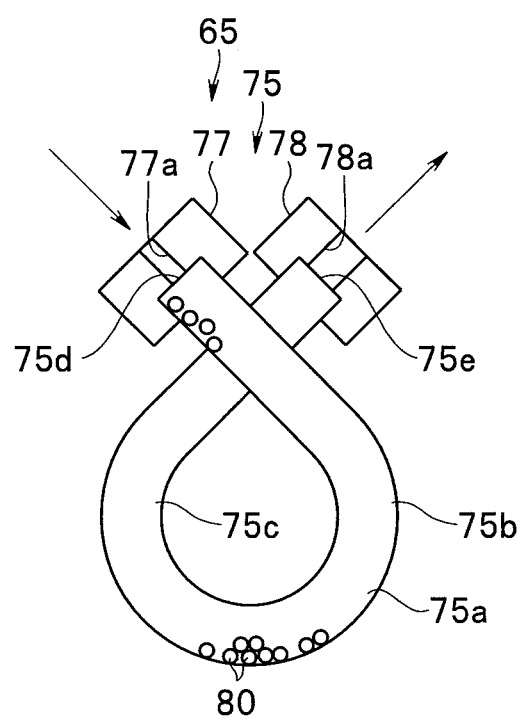
FIG. 12 is a schematic diagram showing a principal part of a medical solid-matter collection apparatus according to a third modification of the first embodiment of the present disclosure.

Further, for example, as shown in FIGS. 11 and 12, the loop portion of the intermediate tube 75 may be fixed so as to draw a circular arc that rotates the liquid from the liquid inflow portion 75d by ¾ of a rotation or more.

In this case, particularly, the loop portion of the intermediate tube 75 may be fixed such that at least one of the central axis of the liquid inflow portion 75d or the central axis of the liquid outflow portion 75e is inclined with respect to the horizontal direction.

In other words, the intermediate tube 75 in a modification shown in FIG. 11 is fixed so as to draw a circular arc in which the angle between the central axis of the liquid inflow portion 75d and the central axis of the liquid outflow portion 75e is 315 degrees.

Further, the intermediate tube 75 in a modification shown in FIG. 12 is fixed so as to draw a circular arc in which the angle between the central axis of the liquid inflow portion 75d and the central axis of the liquid outflow portion 75e is 270 degrees.

Figure 13:
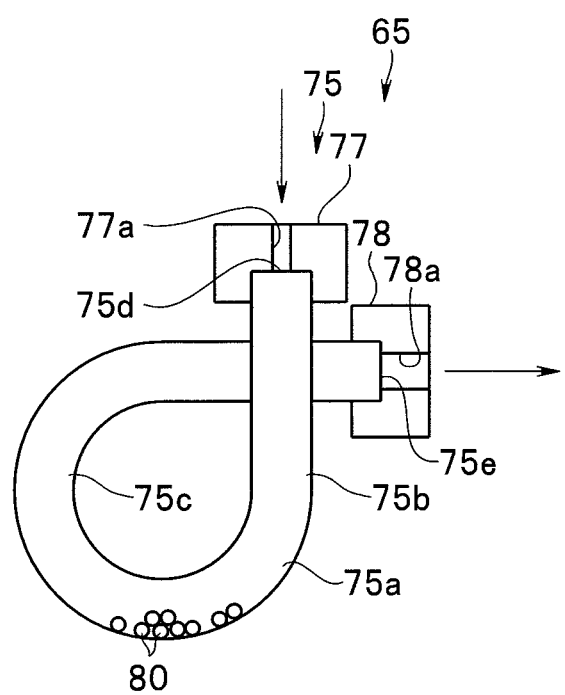
FIG. 13 is a schematic diagram showing a principal part of a medical solid-matter collection apparatus according to a fourth modification of the first embodiment of the present disclosure.
Figure 14:
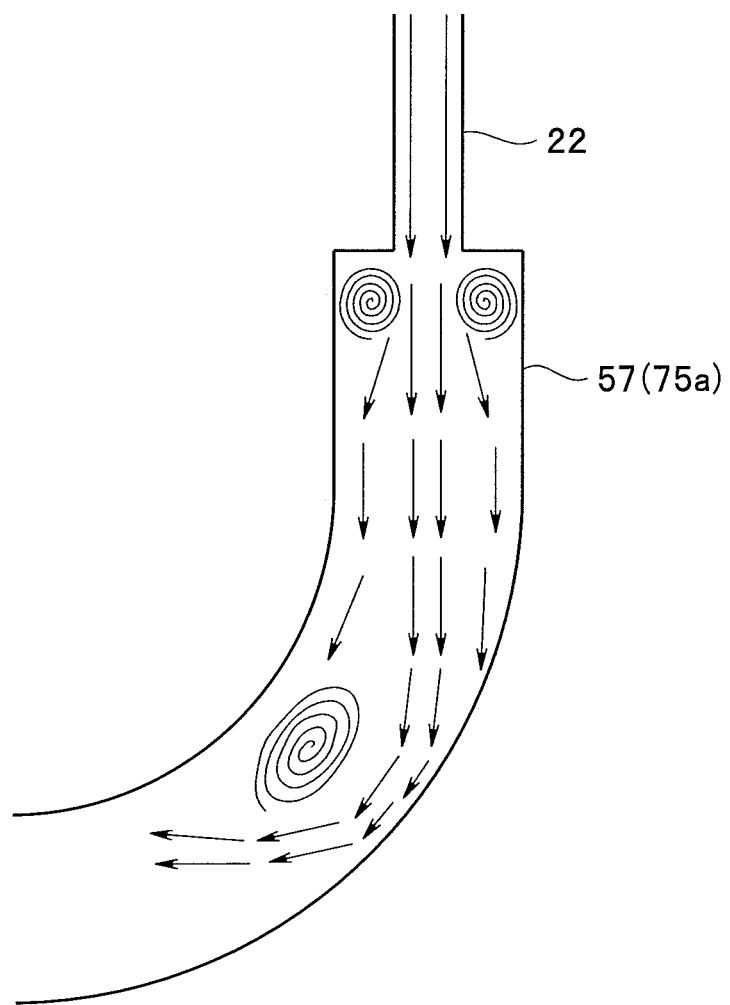
FIG. 14 is an explanatory diagram showing a behavior of the liquid in an interior of the medical solid-matter collection apparatus according to the fourth modification of the first embodiment of the present disclosure.

For example, as shown in FIGS. 13 and 14, the intermediate tube 75 may be fixed such that the central axis of the liquid inflow portion 75d extends in a perpendicular direction.

In other words, the intermediate tube 75 in a modification shown in FIGS. 13 and 14 is fixed so as to draw a circular arc in which the angle between the central axis of the liquid inflow portion 75d and the central axis of the liquid outflow portion 75e is 270 degrees.

Figure 15:
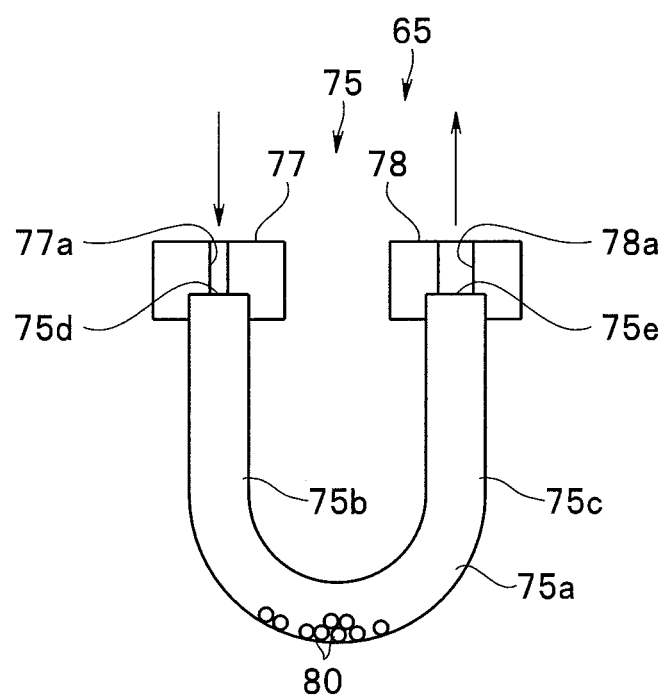
FIG. 15 is a schematic diagram showing a principal part of a medical solid-matter collection apparatus according to a fifth modification of the first embodiment of the present disclosure.

For example, as shown in FIG. 15, the intermediate tube 75 may be fixed such that both of the central axis of the liquid inflow portion 75d and the central axis of the liquid outflow portion 75e extend in the perpendicular direction.

In other words, the intermediate tube 75 in a modification shown in FIG. 15 is fixed so as to draw a circular arc in which the angle between the central axis of the liquid inflow portion 75d and the central axis of the liquid outflow portion 75e is 180 degrees.

Figure 16:
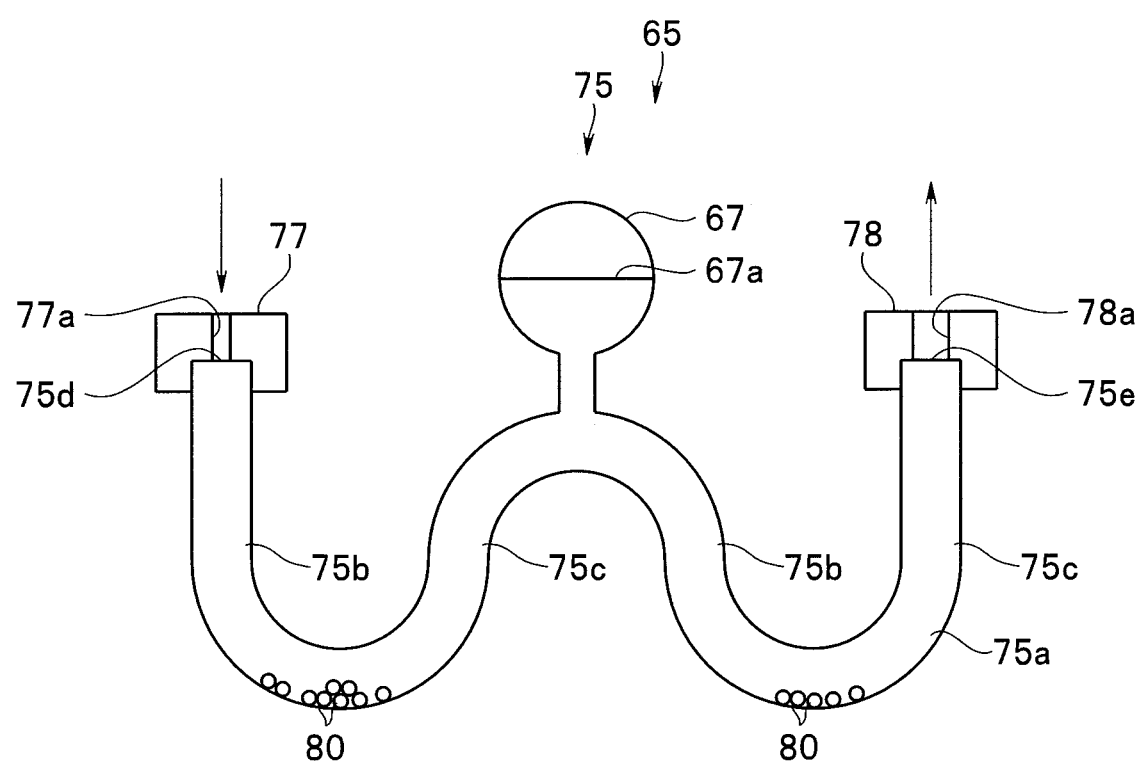
FIG. 16 is a schematic diagram showing a principal part of a medical solid-matter collection apparatus according to a sixth modification of the first embodiment of the present disclosure.

For example, as shown in FIG. 16, the intermediate tube 75 may be fixed in a shape that is not a loop shape.

In other words, the intermediate tube 75 in a modification shown in FIG. 16 is fixed so as to draw a plurality of continuous U-shapes.

Furthermore, in a modification shown in FIG. 16, an air tank 67 configured to absorb the flow ripple of the liquid is interposed at a midway portion of the large-diameter portion 75a.

A wall 67a configured to separate the gas and the liquid and configured to be capable of extending and contracting is provided in an interior of the air tank 67. That is, the wall 67a is flexible.

The capacity (the capacity of the gas region separated by the wall 67a) of the air tank 67 is 5 to 30 cm$^3$, for example.

By this configuration, it is possible to exclude the air chamber 64 that is interposed in the liquid suction tube 22, when appropriate.

Figure 17:
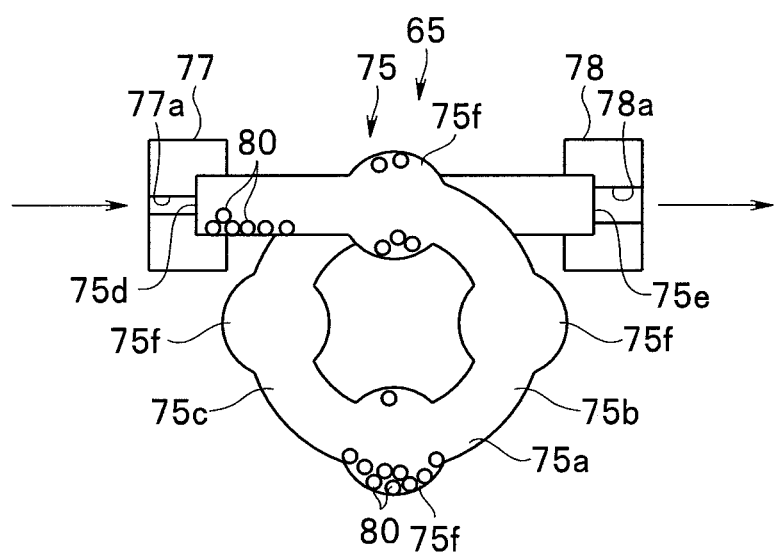
FIG. 17 is a schematic diagram showing a principal part of a medical solid-matter collection apparatus according to a seventh modification of the first embodiment of the present disclosure.

For example, as shown in FIG. 17, the intermediate tube 75 may be configured such that enlarged-diameter portions 75f are formed at midway portions of a loop formed in the large-diameter portion 75a.

The enlarged-diameter portions 75f in a modification shown in FIG. 17 are formed in a spherical shape in which a maximal inner diameter is larger than the inner diameter of the large-diameter portion 75a.

By this configuration, it is possible to further change the flow speed of the liquid that flows through the intermediate tube 75, and to more effectively trap the solid matter such as calculus pieces.

Figure 18:
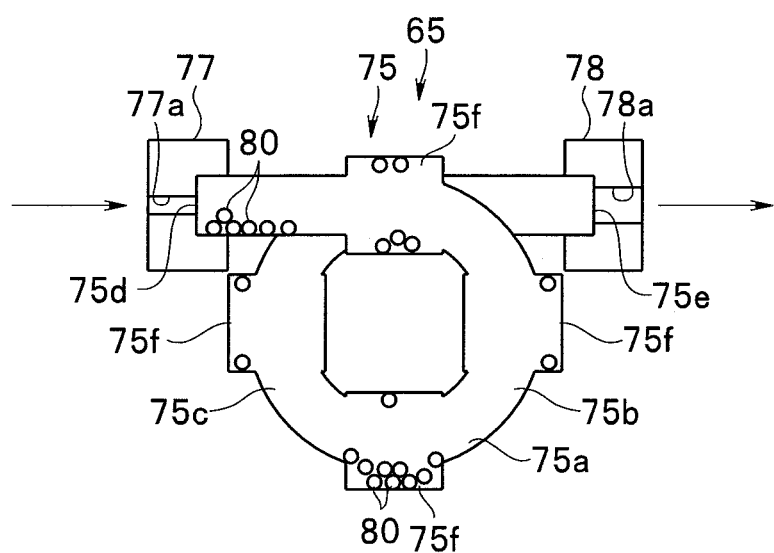
FIG. 18 is a schematic diagram showing a principal part of a medical solid-matter collection apparatus according to an eighth modification of the first embodiment of the present disclosure.

For example, as shown in FIG. 18, the enlarged-diameter portion 75f may be formed in a cylindrical shape.

In other words, as shown in embodiments in FIGS. 17 and 18, it is preferable that the enlarged-diameter portion 75f should be formed as a rotation body around a longitudinal axis of the intermediate tube 75.

Figure 19:
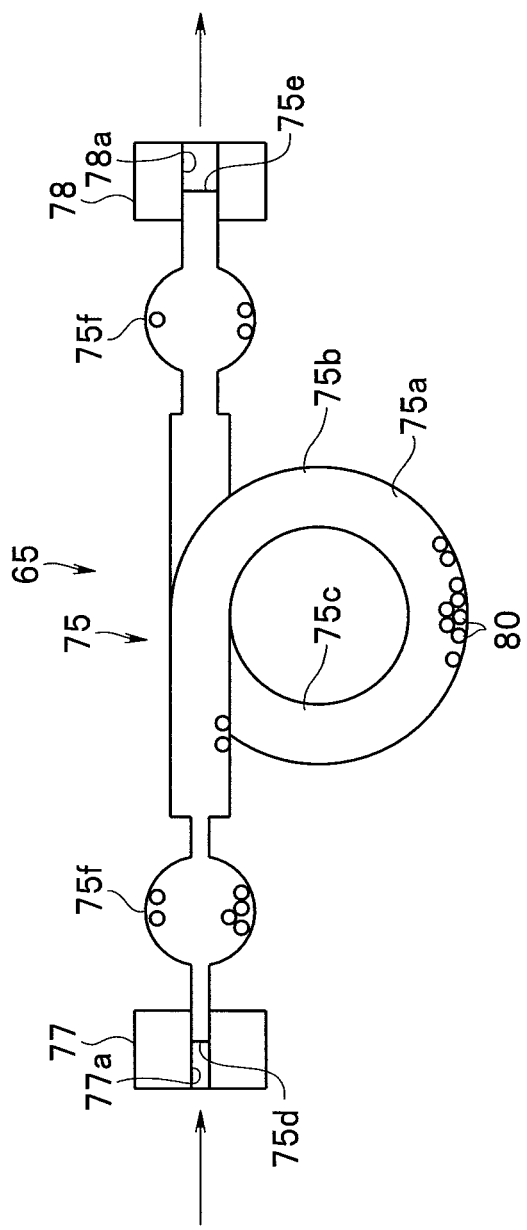
FIG. 19 is a schematic diagram showing a principal part of a medical solid-matter collection apparatus according to a ninth modification of the first embodiment of the present disclosure.
Figure 20:
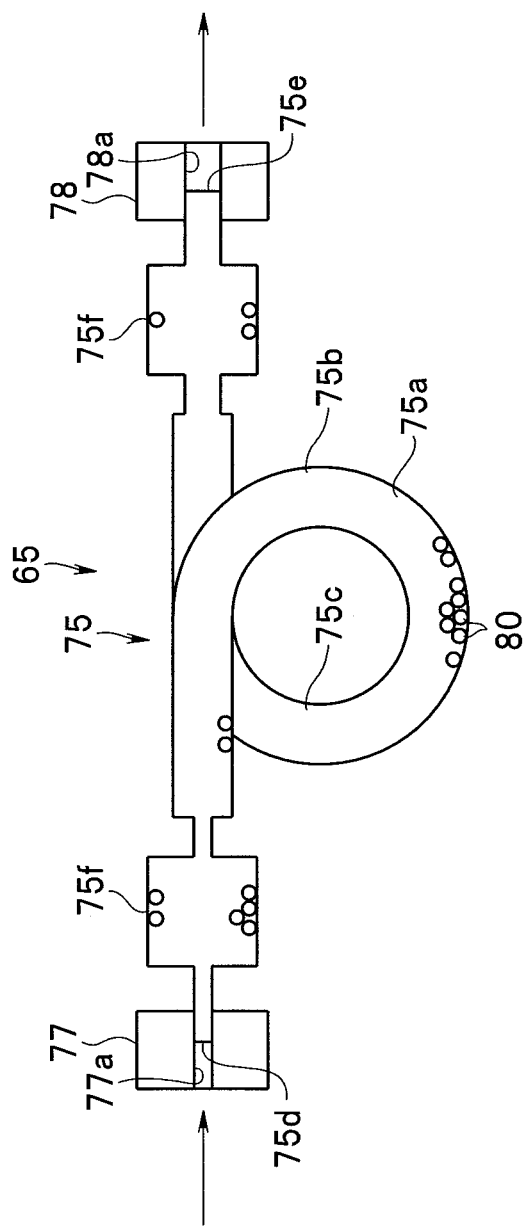
FIG. 20 is a schematic diagram showing a principal part of a medical solid-matter collection apparatus according to a tenth modification of the first embodiment of the present disclosure.

For example, as shown in FIGS. 19 and 20, the enlarged-diameter portion 75f may be formed at a place other than the loop portion of the intermediate tube 75. Walls of the enlarged-diameter portion 75f of the intermediate tube 75 form a portion of a surface of a solid of revolution, wherein a portion of an axis of the solid of revolution is collocated with a longitudinal axis of the intermediate tube. And the walls of the enlarged-diameter portion of the intermediate tube may form a portion of a surface of a polygon, for example, triangle, square, parallelogram, pentagon, and hexagon.

Next, a second embodiment of the present disclosure will be described with reference to FIGS. 21 to 24.

A solid-matter collection apparatus 65 in the present embodiment employs a configuration in which an inflow direction when the liquid is caused to flow into the intermediate tube 75 from an upstream side of the liquid suction tube 22 is set only to a different direction from the direction of a central axis O2 of the intermediate tube 75.

Further, the solid-matter collection apparatus 65 in the present embodiment employs a configuration in which an outflow direction when the liquid is caused to flow out of the intermediate tube 75 to a downstream side of the liquid suction tube 22 is set only to a different direction from the direction of the central axis O2 of the intermediate tube 75.

Note that the solid-matter collection apparatus 65 may employ only at least one of the configuration on the inflow side or the configuration on the outflow side of the liquid for the above-described intermediate tube 75.

In addition, the same compositions as compositions in the above-described first embodiment are denoted by the same reference characters, and descriptions are omitted, when appropriate.

Figure 21:
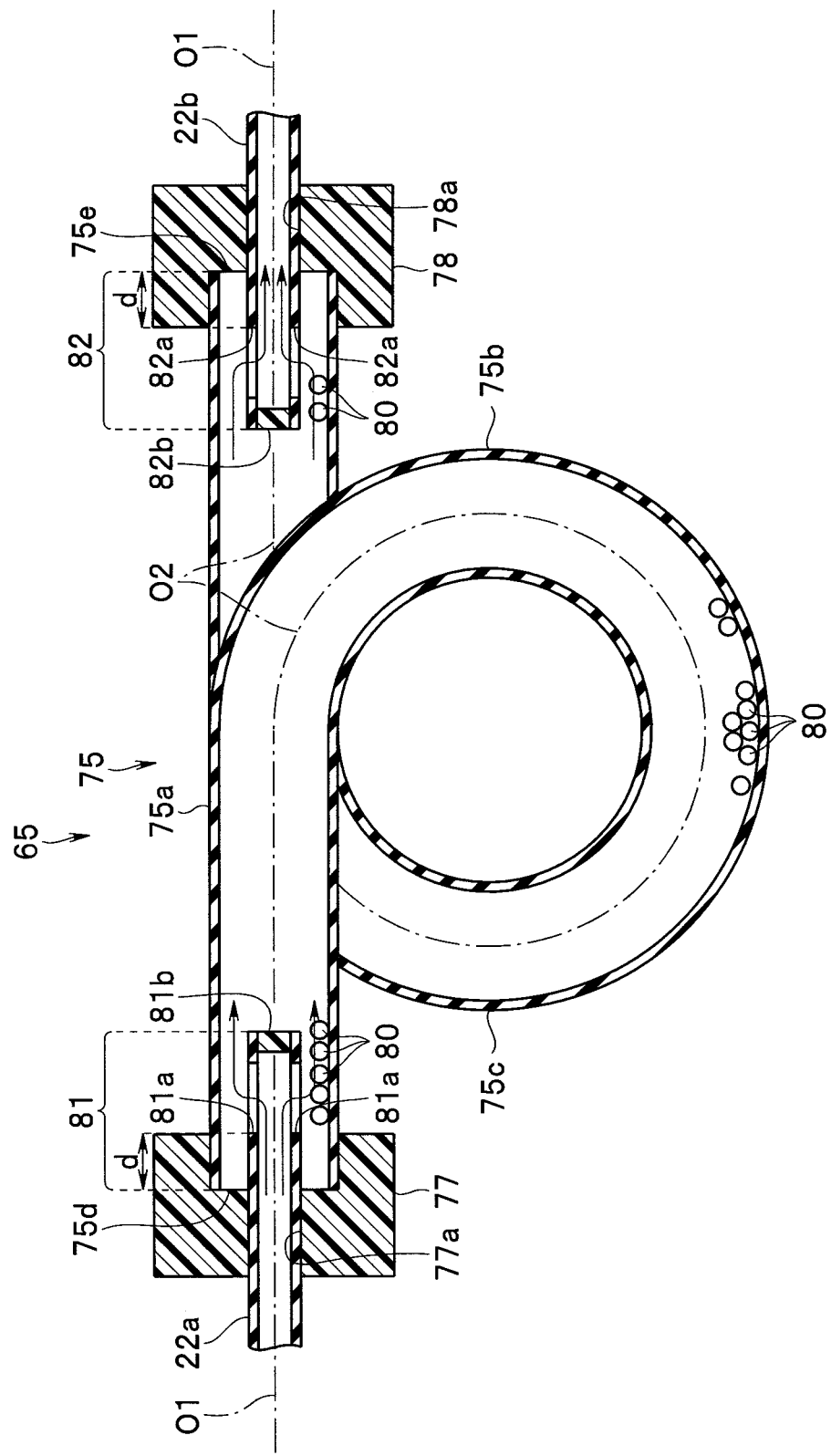
FIG. 21 is a cross-sectional view showing a principal part of a medical solid-matter collection apparatus according to a second embodiment of the present disclosure.

As shown in FIG. 21, a midway portion of the liquid suction tube 22 is divided into an upstream-side tube 22*a* and a downstream-side tube 22*b*.

A downstream-side region 81 of the upstream-side tube 22*a* is inserted into the interior of the intermediate tube 75 through the liquid inflow portion 75*d*.

In the present embodiment, the downstream-side region 81 of the upstream-side tube 22*a* corresponds to a specific example of a first pipe.

In other words, the downstream-side region 81 causes the liquid to flow into the interior of the intermediate tube 75, only in a different direction from the direction of the central axis O2 of the intermediate tube 75.

More specifically, the downstream-side region 81 of the upstream-side tube 22*a* is inserted into the interior of the intermediate tube 75 by passing through the through-hole 77*a* of the first connector 77.

Furthermore, in the interior of the intermediate tube 75, a central axis O1 of the upstream-side tube 22*a* is disposed nearly coaxially with the central axis O2 of the intermediate tube 75.

Note that "nearly coaxially" means that a predetermined error may be included in the disposition between the central axis O1 and the central axis O2, in the present embodiment.

Figure 22:
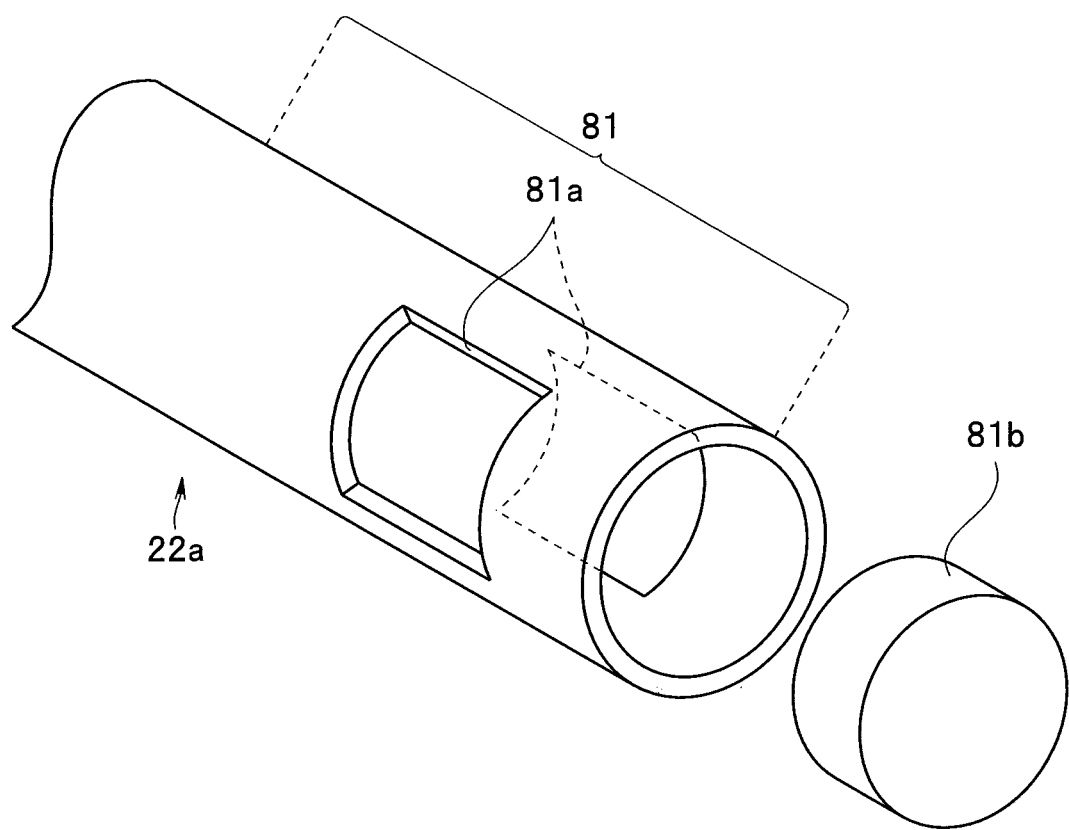
FIG. 22 is a perspective view showing a downstream-side region of an upstream-side tube according to the second embodiment of the present disclosure.

In the interior of the intermediate tube 75, a pair of rectangular holes passing through a wall portion of the downstream-side region 81 are formed as first opening portions 81*a*, in the downstream-side region 81 of the upstream-side tube 22*a* (see FIG. 22).

For example, the first opening portions 81*a* are formed at positions that are a predetermined distance d or more away from the liquid inflow portion 75*d* to the downstream side.

Further, the total value of opening areas of the first opening portions 81*a* is set so as to be larger than a flow passage area of the liquid suction tube 22 (upstream-side tube 22*a*).

Furthermore, a sealing member 81*b* is provided in the downstream-side region 81 of the upstream-side tube 22*a*.

The sealing member 81*b* seals a downstream-side end portion of the upstream-side tube 22*a*, on a downstream side of the first opening portions 81*a*.

In other words, the sealing member 81*b* seals a surface perpendicular to the central axis O1 of the upstream-side tube 22*a*, at a downstream end of the downstream-side region 81.

An upstream-side region 82 of the downstream-side tube 22*b* is inserted into the interior of the intermediate tube 75 through the liquid outflow portion 75*e*.

In the present embodiment, the upstream-side region 82 of the downstream-side tube 22*b* corresponds to a specific example of a second pipe.

In other words, the upstream-side region 82 causes the liquid to flow into an interior of the downstream-side tube 22*b*, only in a different direction from the direction of the central axis O2 of the intermediate tube 75.

More specifically, the upstream-side region 82 of the downstream-side tube 22*b* is inserted into the interior of the intermediate tube 75 by passing through the through-hole 78*a* of the second connector 78.

Furthermore, in the interior of the intermediate tube 75, the central axis O1 of the downstream-side tube 22*b* is disposed nearly coaxially with the central axis O2 of the intermediate tube 75.

Further, in the interior of the intermediate tube 75, for example, a pair of rectangular holes passing through a wall portion of the upstream-side region 82 are formed as second opening portions 82*a*, in the upstream-side region 82 of the downstream-side tube 22*b*.

For example, the second opening portions 82*a* are formed at positions that are the predetermined distance d or more away from the liquid outflow portion 75*e* to the upstream side.

Further, the total value of opening areas of the second opening portions 82*a* is set so as to be larger than a flow passage area of the liquid suction tube 22 (downstream-side tube 22*b*).

Furthermore, a sealing member 82*b* is provided in the upstream-side region 82 of the downstream-side tube 22*b*.

The sealing member 82*b* seals an upstream-side end portion of the downstream-side tube 22*b*, on an upstream side of the second opening portions 82*a*.

In other words, the sealing member 82*b* seals a surface perpendicular to the central axis O1 of the downstream-side tube 22*b*, at an upstream end of the upstream-side region 82.

Note that the first pipe may be constituted by a separate member from the upstream-side tube 22*a*, in the present embodiment.

In this case, the first pipe constituted by the separate member is connected to the downstream-side end portion of the upstream-side tube 22*a*.

Similarly, the second pipe may be constituted by a separate member from the downstream-side tube 22*b*.

In this case, the second pipe constituted by the separate member is connected to the upstream-side end portion of the downstream-side tube 22*b*.

In this configuration, the liquid flowing through the upstream-side tube 22*a* flows into the intermediate tube 75 through the first opening portions 81*a*.

On that occasion, the effective area of the conduit rapidly changes, and thereby the flow speed of the liquid rapidly decreases.

In addition, the liquid flows into the interior of the intermediate tube 75, only in a different direction from the direction of the central axis O2 of the intermediate tube 75.

In other words, the liquid flows into the interior of the intermediate tube 75, only in a different direction from the flowing direction of the liquid in the interior of the intermediate tube 75.

Accordingly, at a vicinity of the first opening portions 81*a*, a disturbance of the flow of the liquid occurs in the interior of the intermediate tube 75.

Because of the rapid change in the flow speed of the liquid and the occurrence of the disturbance just after the liquid flows into the interior of the intermediate tube 75, the solid-matter collection apparatus 65 can precipitate and adequately trap some solid matter 80 that is of the solid matter 80 such as calculus pieces contained in the liquid and that has a higher specific gravity than the liquid.

Further, the liquid flowing through the intermediate tube 75 flows into the downstream-side tube 22*b* through the second opening portions 82*a*.

In this case, the liquid flows into the downstream-side tube 22*b* from the intermediate tube 75, only in a different direction from the direction of the central axis O2 of the intermediate tube 75.

In other words, the liquid flows into the downstream-side tube 22*b* from the intermediate tube 75, only in a different direction from the flowing direction of the liquid in the interior of the intermediate tube 75.

Accordingly, on the downstream side of the intermediate tube 75, the liquid bypasses an upstream end of the downstream-side tube 22b, and reaches the second opening portions 82a.

By causing the liquid to bypass in this way, when the liquid flows into the downstream-side tube 22b, the solid-matter collection apparatus 65 can adequately trap the solid matter 80 remaining in the liquid in small amounts, in the interior of the intermediate tube 75.

Furthermore, the solid-matter collection apparatus 65 in the present embodiment can adequately collect the solid matter 80, regardless of the change in attitude that occurs when the solid-matter collection apparatus 65 is being used in an operating room or the like.

In other words, the downstream-side region 81 of the upstream-side tube 22a is inserted into the interior of the intermediate tube 75.

Further, the downstream-side end portion of the downstream-side region 81 is closed by the sealing member 81b.

Further, the first opening portions 81a are opened at positions that are the predetermined distance d or more away from the liquid inflow portion 75d, in different directions from the central axis O2 of the intermediate tube 75.

Figure 23:
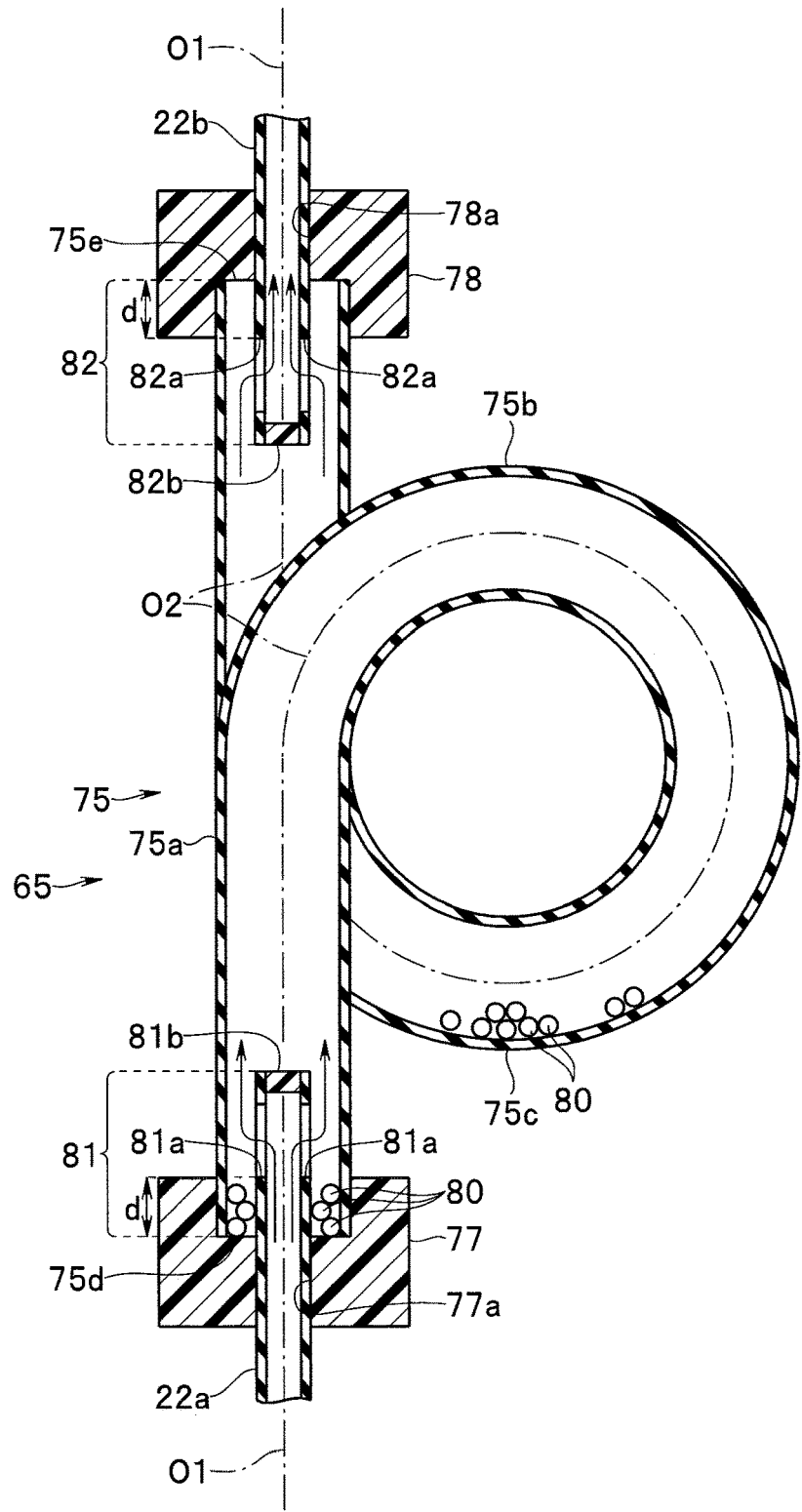
FIG. 23 is a cross-sectional view showing a principal part of the medical solid-matter collection apparatus in which an upstream side of an intermediate tube is oriented to a lower side according to the second embodiment of the present disclosure.

By this configuration, for example, as shown in FIG. 23, even when the attitude of the solid-matter collection apparatus 65 changes in a direction in which the upstream side of the intermediate tube 75 is oriented to the lower side in the gravity direction, it is possible to hold the solid matter 80 precipitated at the vicinity of the first opening portions 81a, between the intermediate tube 75 and the downstream-side region 81 of the upstream-side tube 22a, without causing the solid matter 80 to reversely flow to the interior of the upstream-side tube 22a.

Note that the solid-matter collection apparatus 65 may be configured such that the position of the insertion of the upstream-side tube 22a into the through-hole 77a of the first connector 77 can be altered.

In the case of this configuration, it is possible to arbitrarily alter the distance d from the liquid inflow portion 75d to the first opening portion 81a, depending on intended use or the like.

Similarly, the upstream-side region 82 of the downstream-side tube 22b is inserted into the interior of the intermediate tube 75.

Further, the upstream-side end portion of the upstream-side region 82 is closed by the sealing member 82b.

Further, the second opening portions 82a are opened at positions that are the predetermined distance d or more away from the liquid outflow portion 75e, in different directions from the central axis O2 of the intermediate tube 75.

Figure 24:
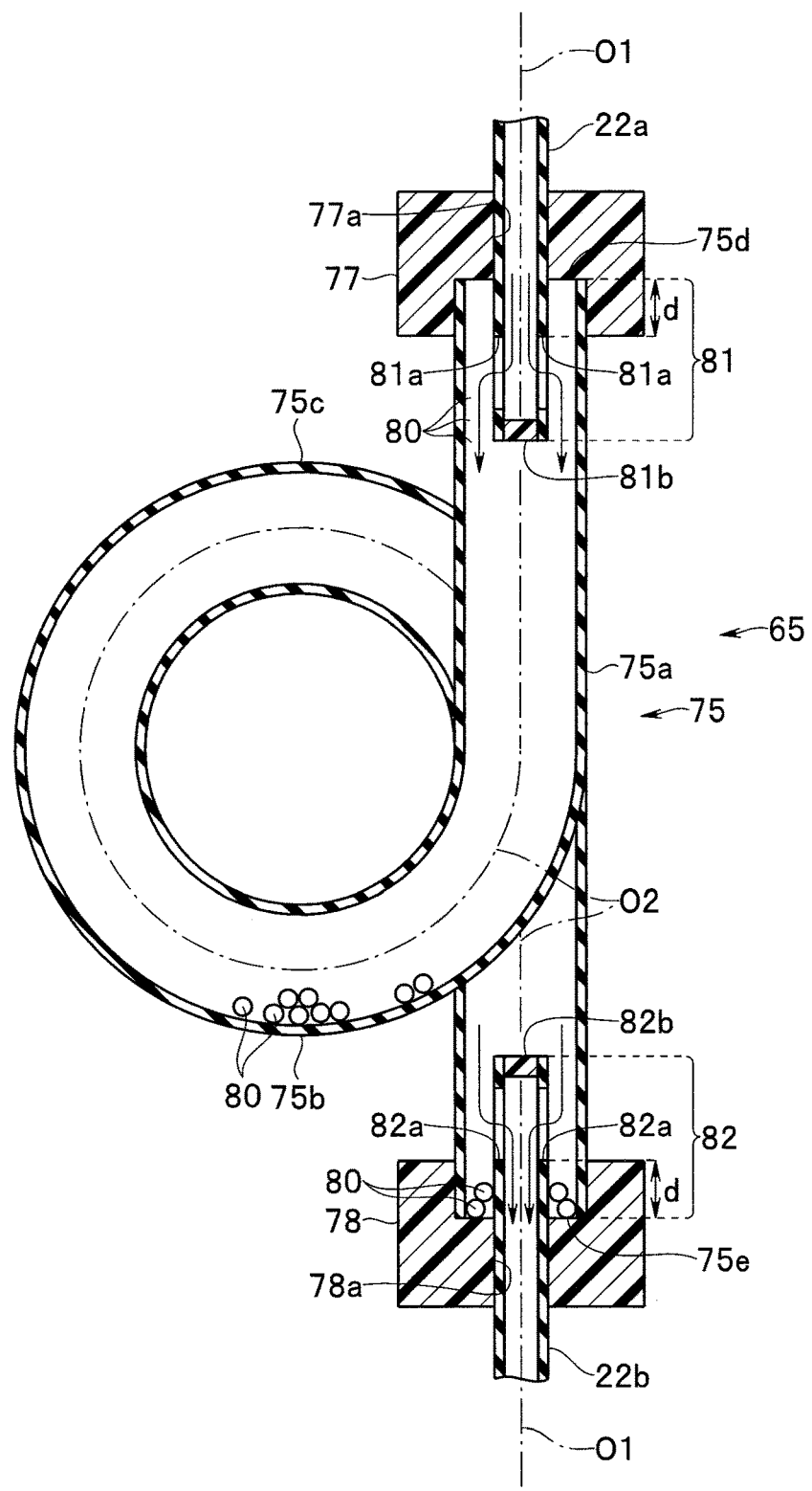
FIG. 24 is a cross-sectional view showing a principal part of the medical solid-matter collection apparatus in which a downstream side of the intermediate tube is oriented to the lower side according to the second embodiment of the present disclosure.

By this configuration, for example, as shown in FIG. 24, even when the downstream side of the intermediate tube 75 is oriented to the lower side in the gravity direction, it is possible to hold the solid matter 80 precipitated at the vicinity of the second opening portions 82a, between the intermediate tube 75 and the downstream-side region 82 of the downstream-side tube 22b, without causing the solid matter 80 to flow into the interior of the downstream-side tube 22b.

Note that the solid-matter collection device 65 may be configured such that the position of the insertion of the downstream-side tube 22b into the through-hole 78a of the second connector 78 can be altered.

In the case of this configuration, it is possible to arbitrarily alter the distance d from the liquid outflow portion 75e to the second opening portion 82a, depending on intended use or the like.

Figure 25:
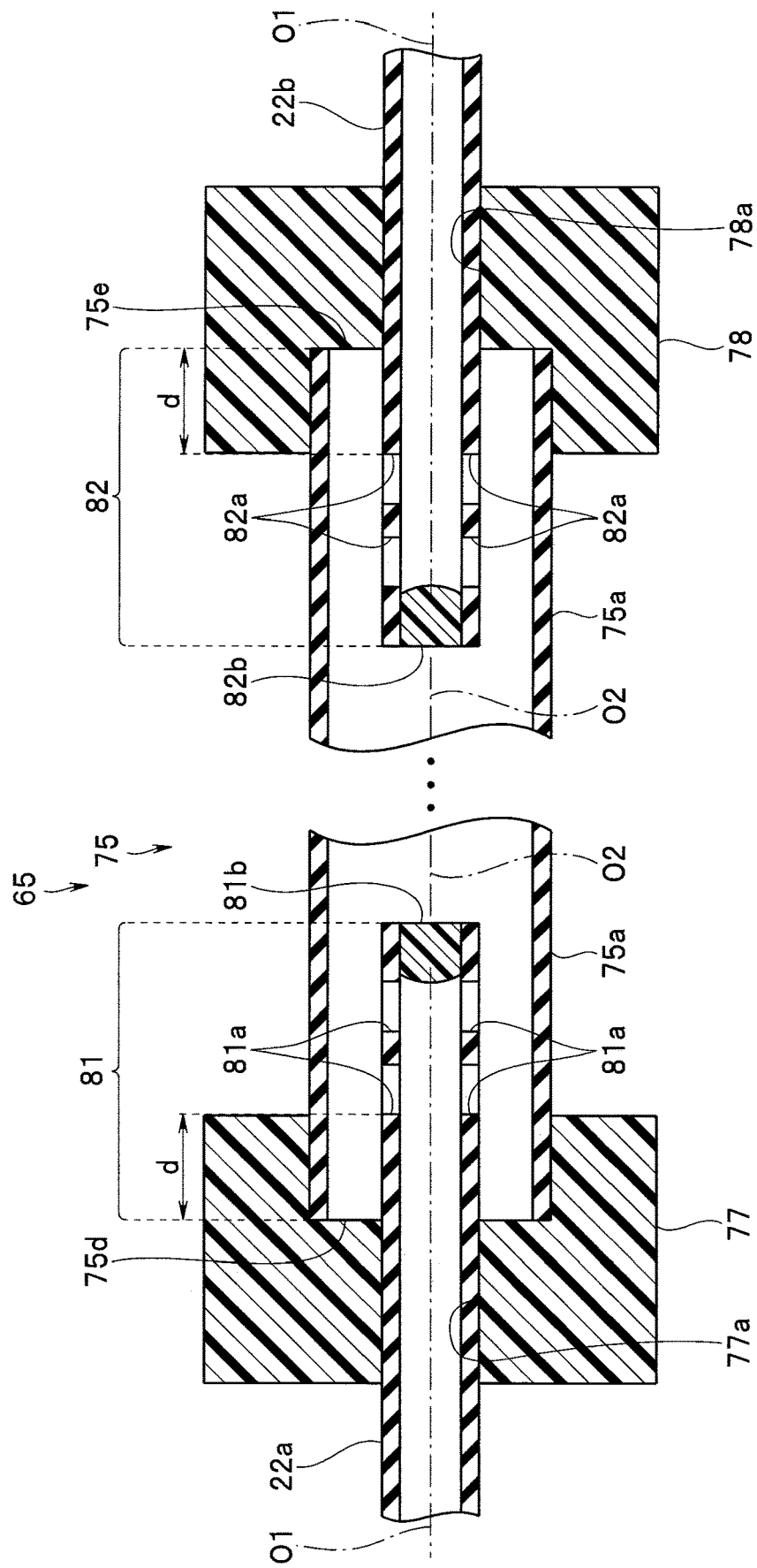
FIG. 25 is a cross-sectional view showing principal parts of an upstream side and a downstream side of a medical solid-matter collection apparatus according to a first modification of the second embodiment of the present disclosure.

For example, as shown in FIG. 25, two or more pairs of rectangular holes may be provided at each of the downstream-side region 81 and the upstream-side region 82, as the first opening portion 81a and the second opening portion 82a.

In this case, it is preferable that at least the length of a short side of each rectangular hole configuring the first opening portion 81a should be set to a sufficiently larger value than the grain size of the solid matter 80.

By this configuration, it is possible to easily cause the solid matter 80 to flow into the interior of the intermediate tube 75.

Figure 26:
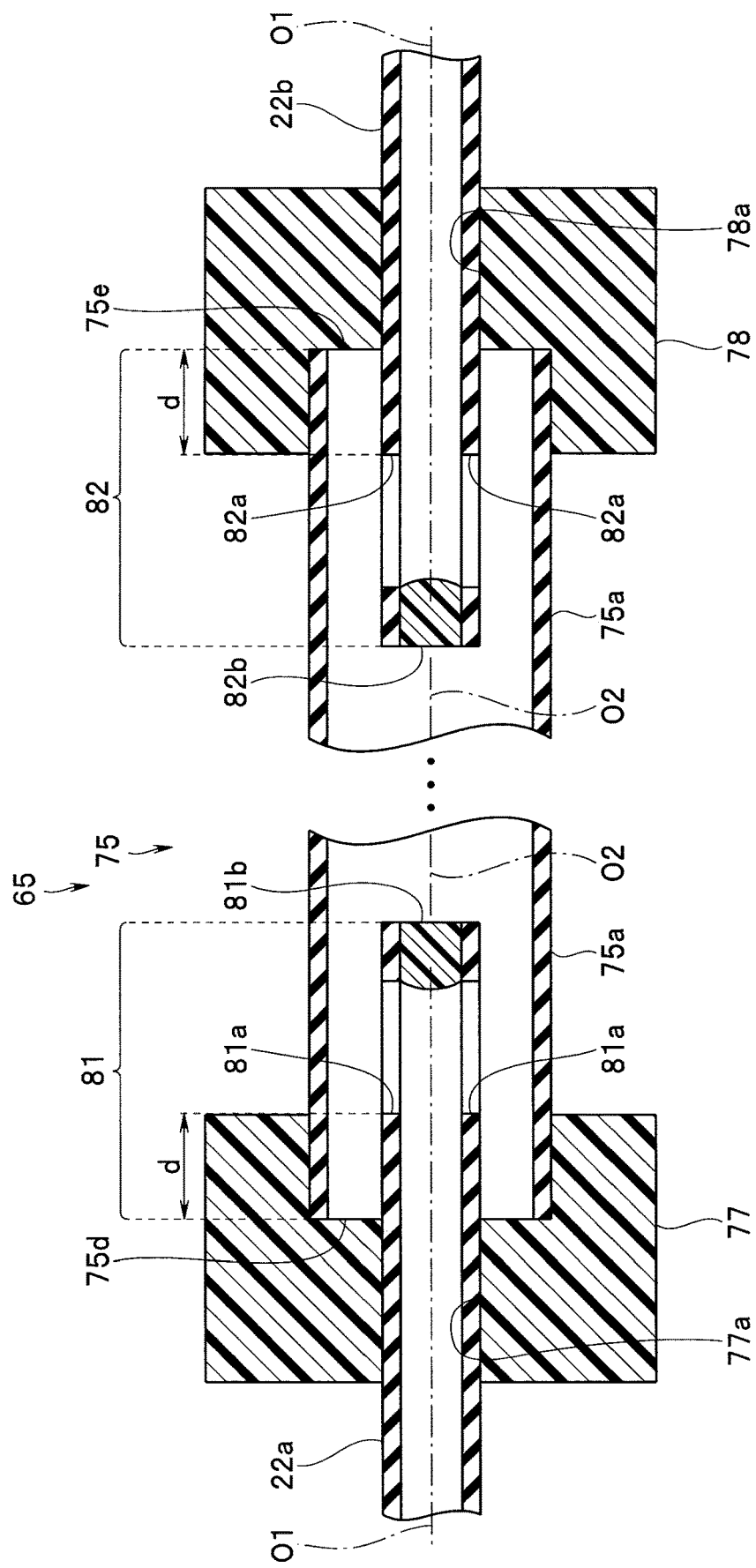
FIG. 26 is a cross-sectional view showing principal parts of an upstream side and a downstream side of a medical solid-matter collection apparatus according to a second modification of the second embodiment of the present disclosure.

For example, as shown in FIG. 26, it is preferable to equalize at least the position of an end portion of the sealing member 81b that closes the upstream-side tube 22a and the position of an end portion of the first opening portion 81a.

By this configuration, it is possible to easily cause the solid matter 80 to flow into the interior of the intermediate tube 75 in the longitudinal axis of the intermediate tube 75.

Figure 27:
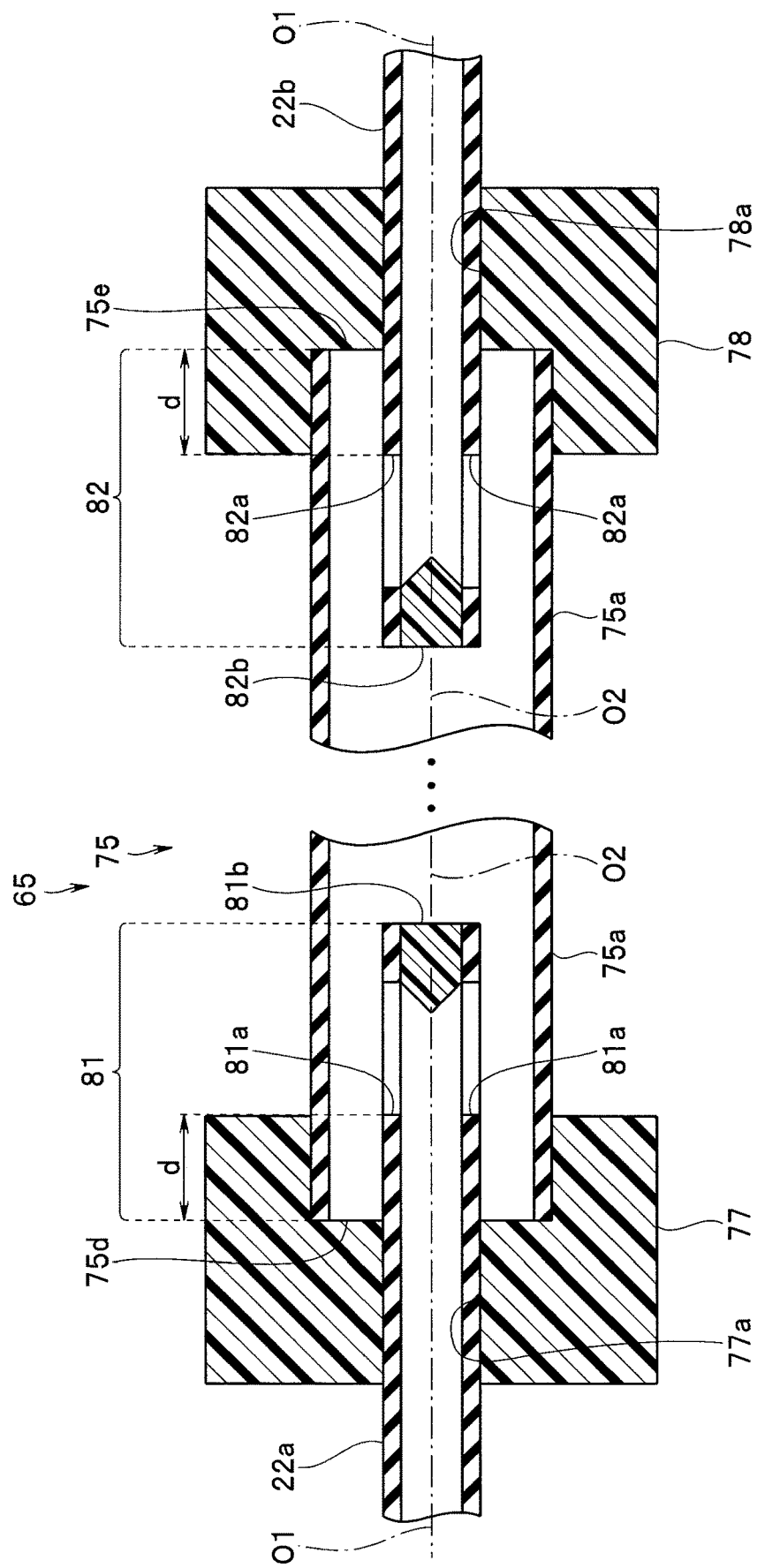
FIG. 27 is a cross-sectional view showing principal parts of an upstream side and a downstream side of a medical solid-matter collection apparatus according to a third modification of the second embodiment of the present disclosure.

For example, as shown in FIG. 27, inclined surfaces 81c, 82c may be formed on the respective sealing members 81, 82.

By this configuration, it is possible to appropriately control the flow of the liquid at the times of the inflow and outflow of the liquid for the intermediate tube 75.

Figure 28:
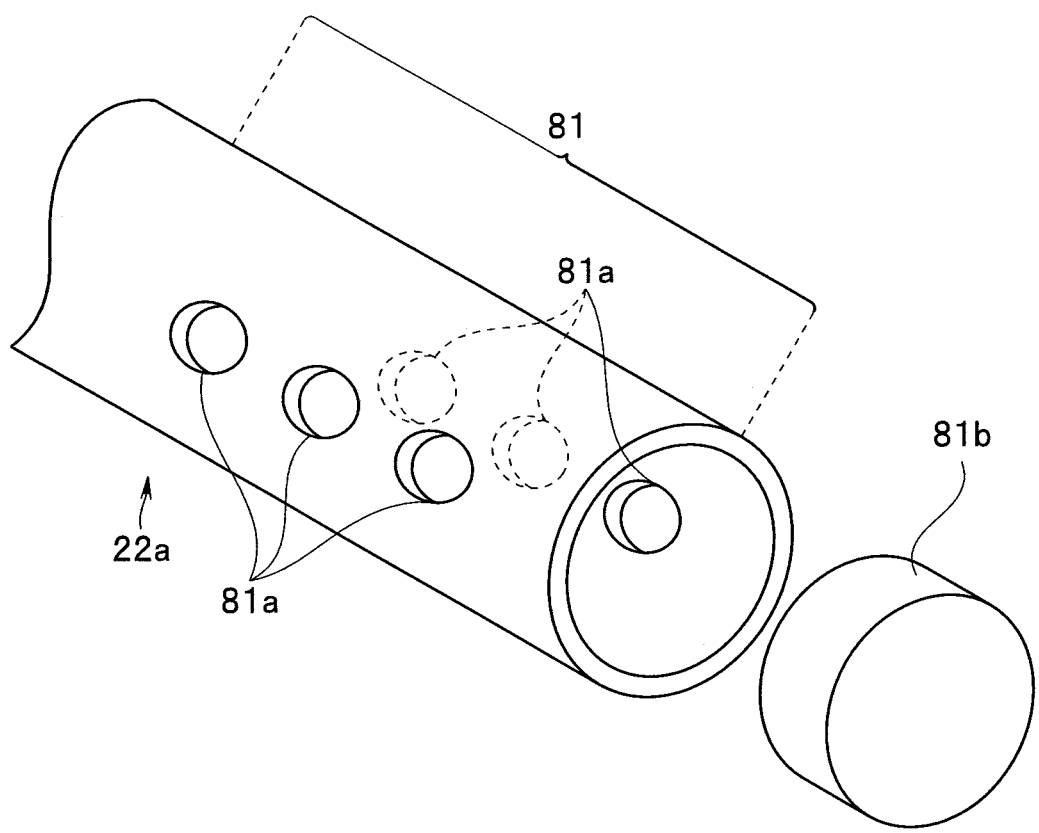
FIG. 28 is a perspective view showing a downstream-side region of an upstream-side tube according to a fourth modification of the second embodiment of the present disclosure.

For example, as shown in FIG. 28, the first opening portions 81a (and the second opening portions 82a) may be configured by circular holes.

Figure 29:
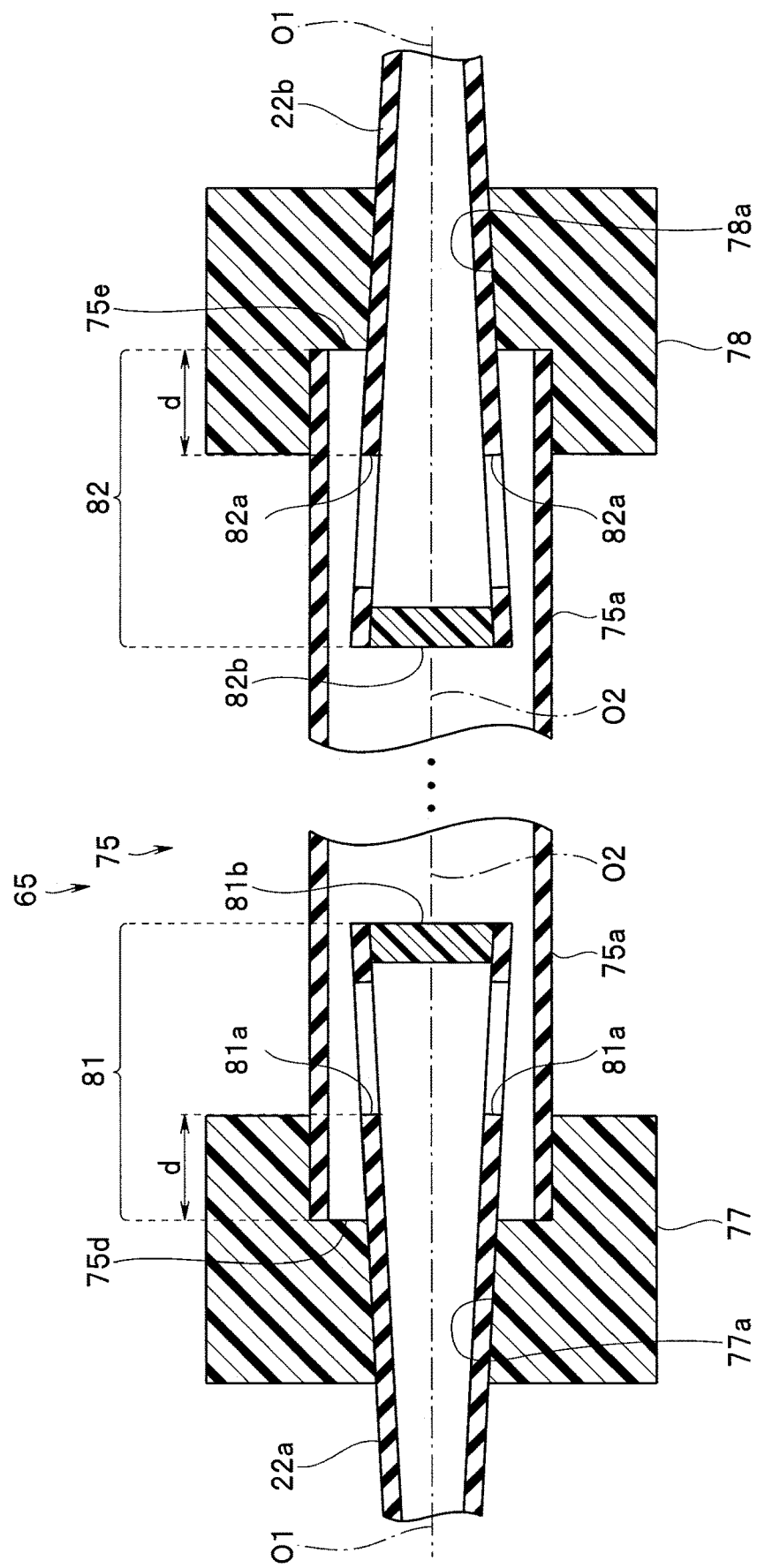
FIG. 29 is a cross-sectional view showing principal parts of an upstream side and a downstream side of a medical solid-matter collection apparatus according to a fifth modification of the second embodiment of the present disclosure.

For example, as shown in FIG. 29, each of the downstream-side region 81 of the upstream-side tube 22a and the upstream-side region 82 of the downstream-side tube 22b may be configured by a tube body having a flaring shape.

In other words, the upstream-side tube 22a and the downstream-side tube 22b may be formed such that the inner diameter of a portion inserted into the intermediate tube 75 is different from the inner diameter of a portion positioned outside of the intermediate tube 75.

By this configuration, it is possible to adjust the flow speed at the times of the inflow and outflow of the liquid for the intermediate tube 75, with a high flexibility.

Figure 30:
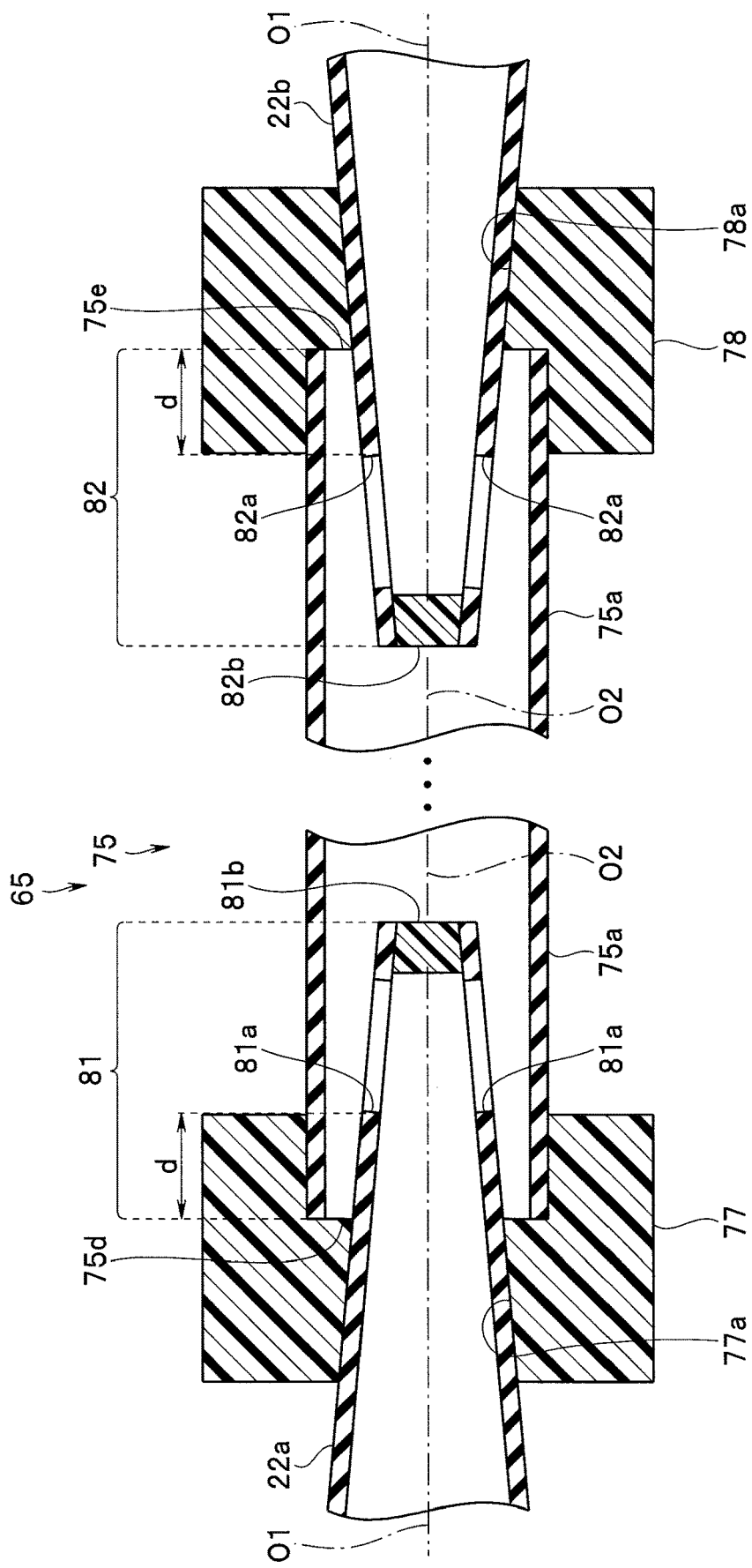
FIG. 30 is a cross-sectional view showing principal parts of an upstream side and a downstream side of a medical solid-matter collection apparatus according to a sixth modification of the second embodiment of the present disclosure.

For example, as shown in FIG. 30, each of the downstream-side region 81 of the upstream-side tube 22a and the upstream-side region 82 of the downstream-side tube 22b may be configured by a tube body having a tapering shape.

In other words, the upstream-side tube 22a and the downstream-side tube 22b may be formed such that the inner diameter of a portion inserted into the intermediate tube 75 is different from the inner diameter of a portion positioned outside of the intermediate tube 75.

By this configuration, it is possible to adjust the flow speed at the times of the inflow and outflow of the liquid for the intermediate tube 75, with a high flexibility.

Figure 31:
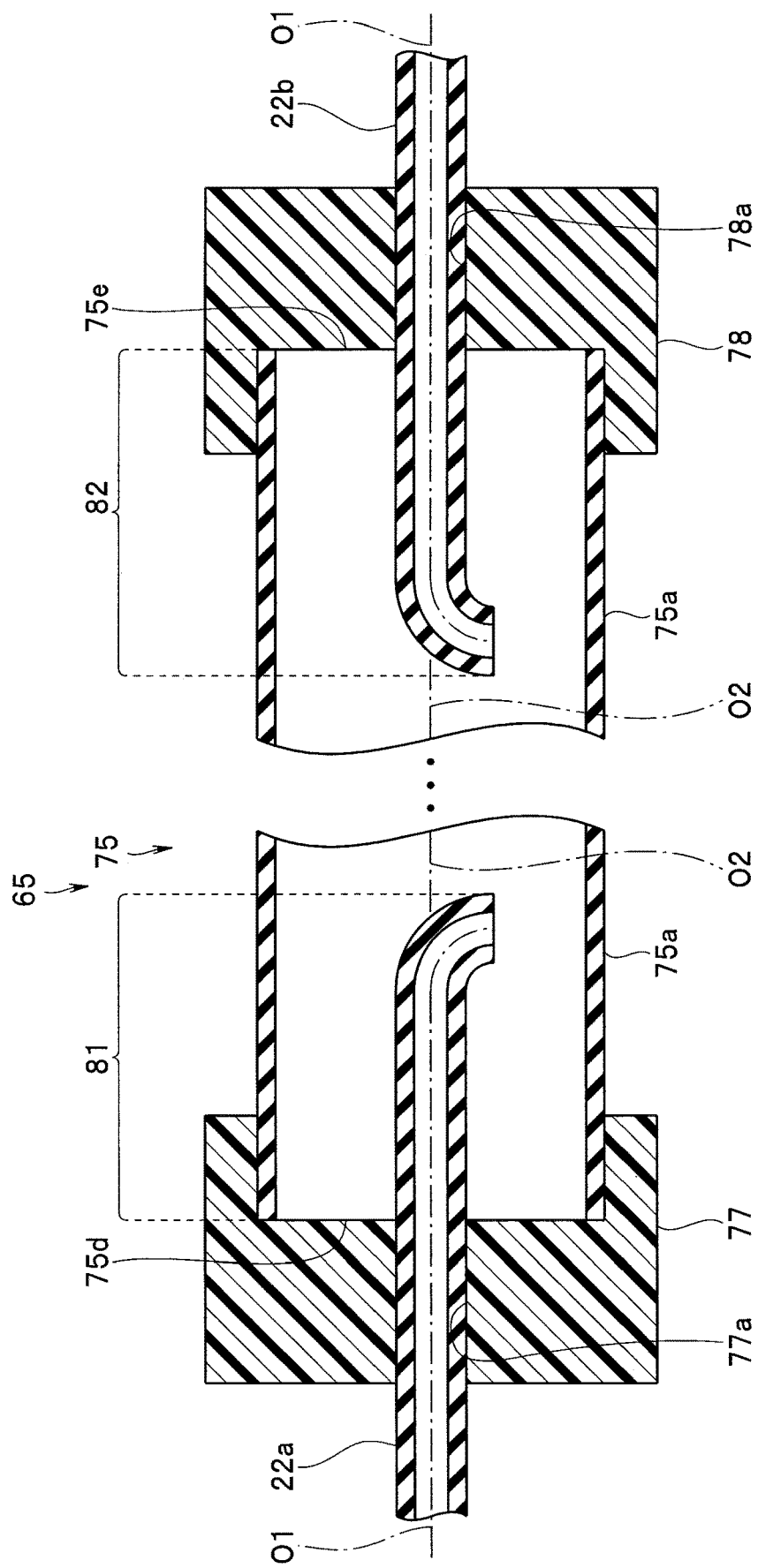
FIG. 31 is a cross-sectional view showing principal parts of an upstream side and a downstream side of a medical solid-matter collection apparatus according to a seventh modification of the second embodiment of the present disclosure.

For example, as shown in FIG. 31, the downstream-side region 81 of the upstream-side tube 22a and the upstream-side region 82 of the downstream-side tube 22b may be curved in a different direction from the central axis O2 of the intermediate tube 75.

By this configuration, it is possible to set the inflow direction and the outflow direction of the liquid for the intermediate tube 75, to arbitrary directions, by a simpler configuration.

Figure 32:
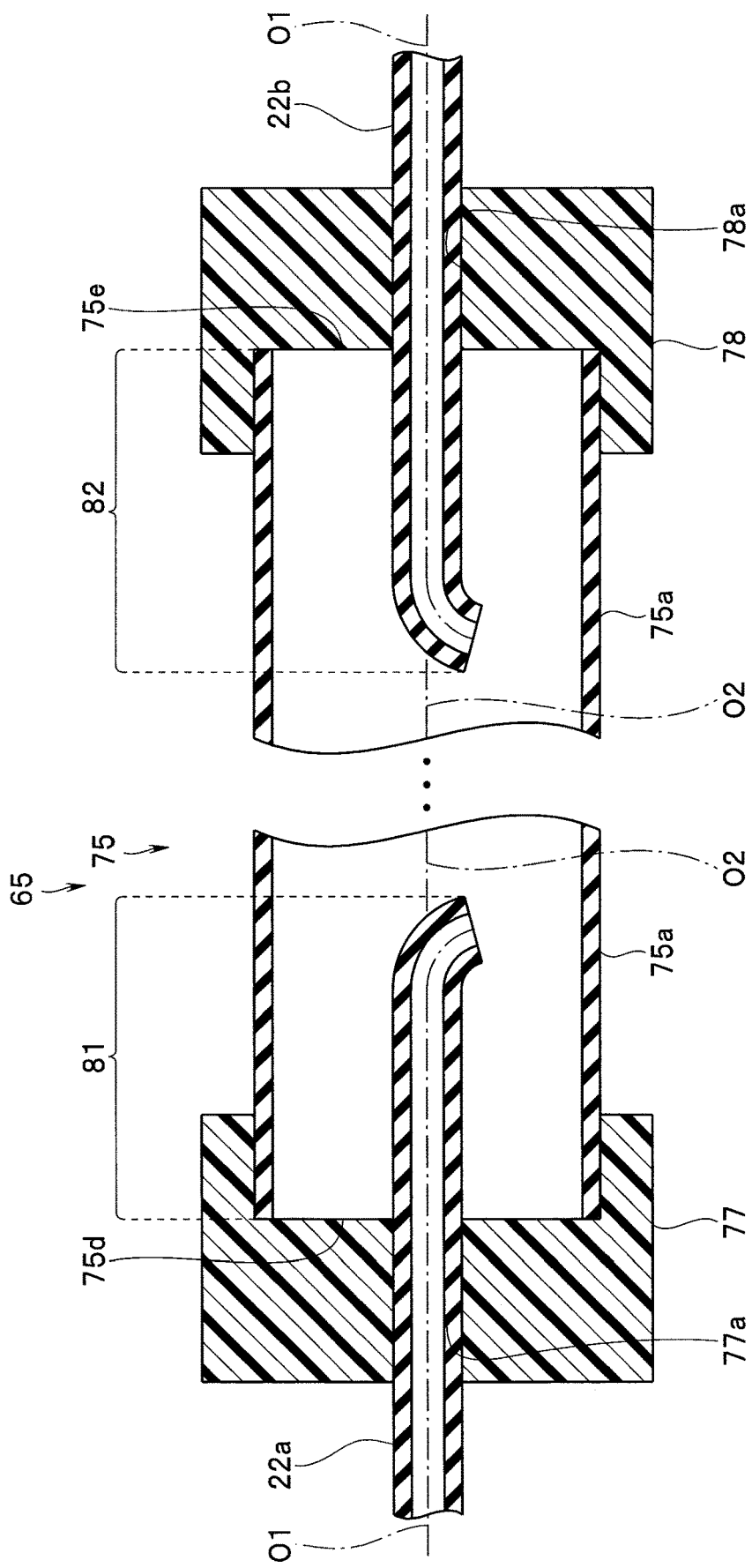
FIG. 32 is a cross-sectional view showing principal parts of an upstream side and a downstream side of a medical solid-matter collection apparatus according to an eighth modification of the second embodiment of the present disclosure.

In this case, for example, as shown in FIG. 32, each curve angle of the downstream-side region 81 of the upstream-side tube 22a and the upstream-side region 82 of the downstream-side tube 22b may be less than 90 degrees.

Figure 33:
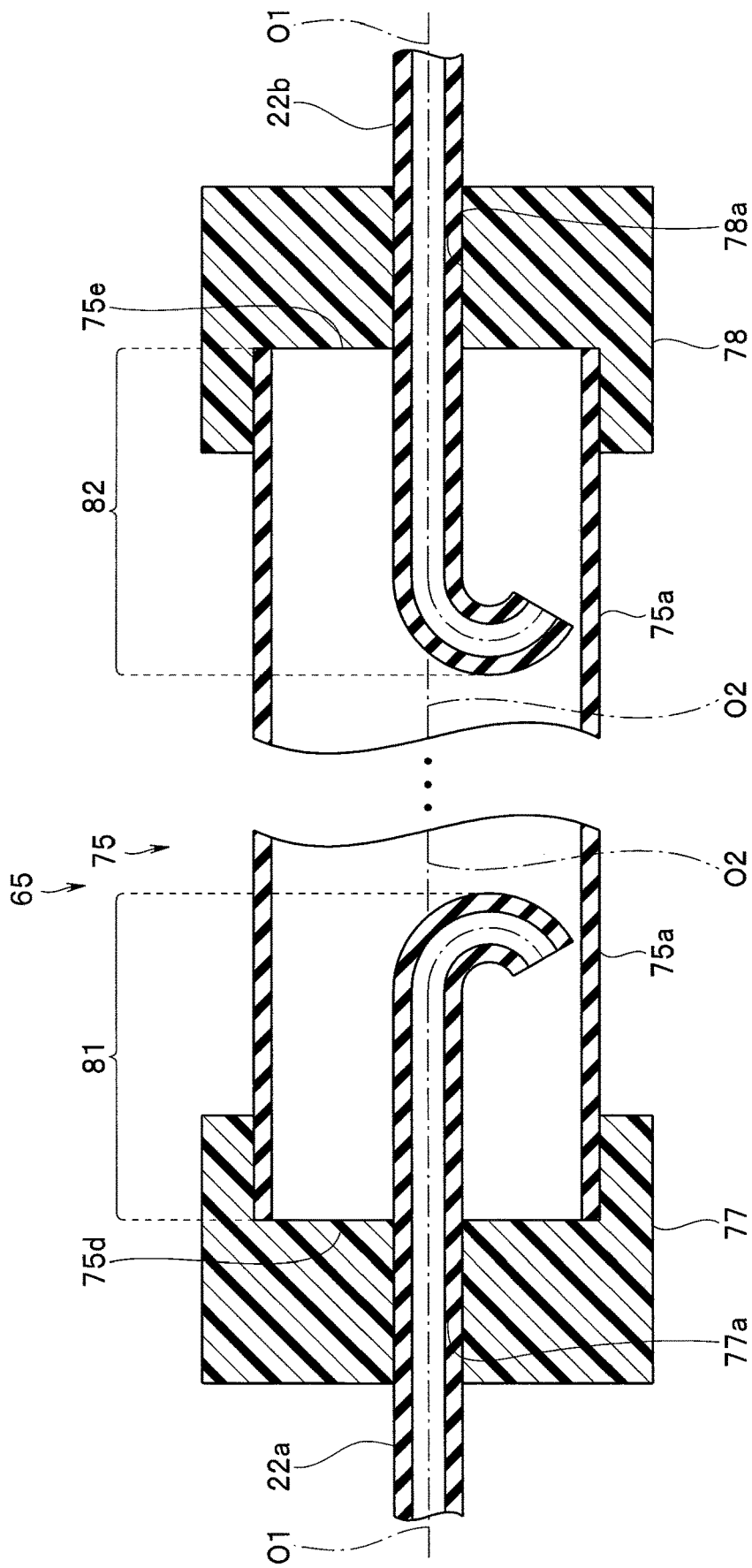
FIG. 33 is a cross-sectional view showing principal parts of an upstream side and a downstream side of a medical solid-matter collection apparatus according to a ninth modification of the second embodiment of the present disclosure.

Alternatively, for example, as shown in FIG. 33, each curve angle of the downstream-side region 81 of the upstream-side tube 22a and the upstream-side region 82 of the downstream-side tube 22b may be more than 90 degrees.

Figure 34:
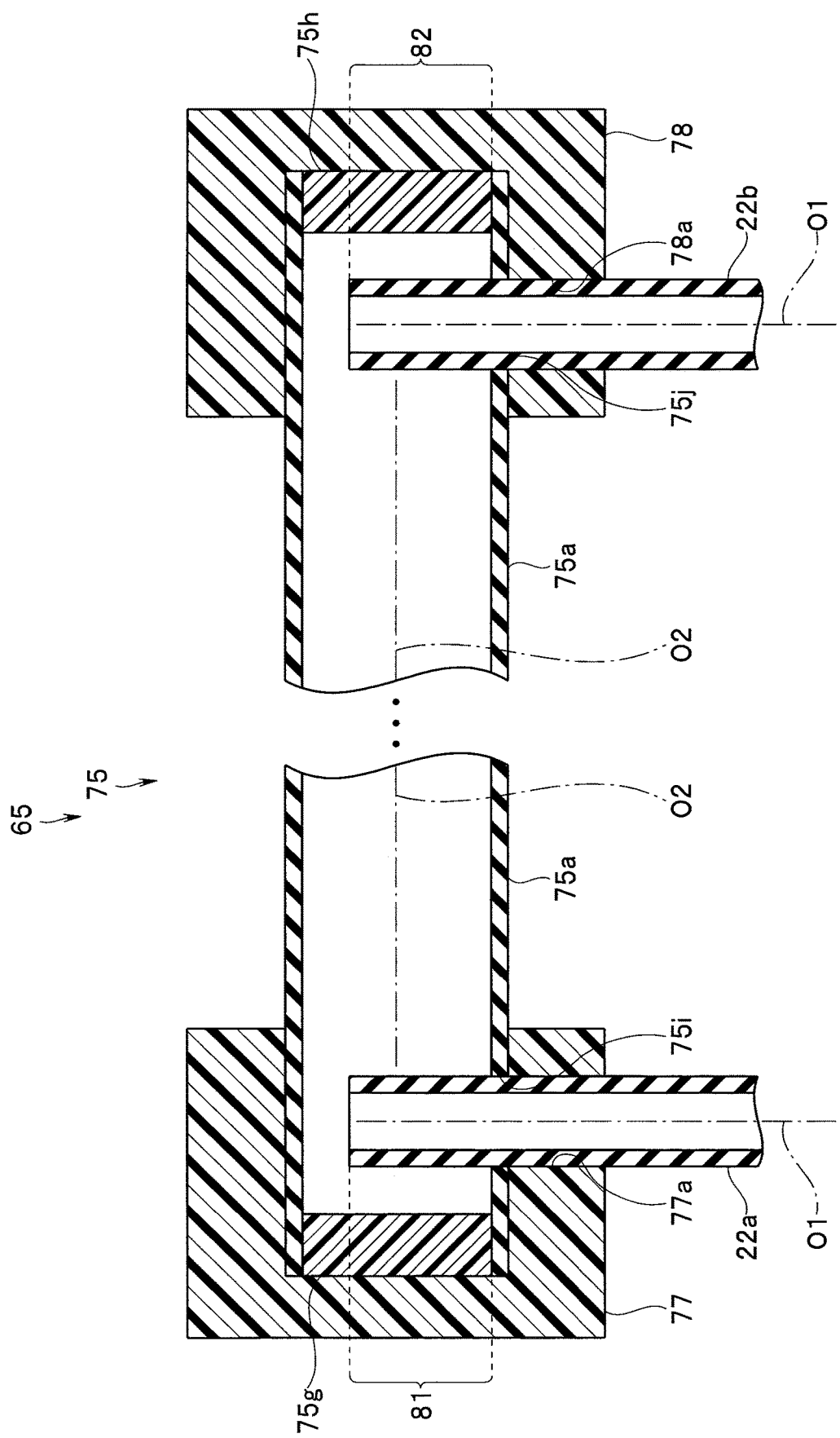
FIG. 34 is a cross-sectional view showing principal parts of an upstream side and a downstream side of a medical solid-matter collection apparatus according to a tenth modification of the second embodiment of the present disclosure.

For example, as shown in FIG. 34, the direction of the insertion of the upstream-side tube 22a and downstream-side tube 22b into the intermediate tube 75 can be set to a different direction from the central axis O2.

In this case, for example, an upstream end and a downstream end of the intermediate tube 75 are closed by sealing members 75g, 75h, respectively.

Further, through-holes 75i, 75j are formed on wall portions on the upstream side and the downstream side of the intermediate tube 75, respectively.

Furthermore, the through-hole 77a of the first connector 77 and the through-hole 78a of the second connector 78 are provided at positions corresponding to the through-holes 75i, 75j of the intermediate tube 75, respectively.

The downstream-side region 81 of the upstream-side tube 22a is inserted into the interior of the intermediate tube 75, through the through-hole 77a and the through-hole 75i.

The upstream-side region 82 of the downstream-side tube 22b is inserted into the interior of the intermediate tube 75, through the through-hole 78a and the through-hole 75j.

By this configuration, it is possible to cause the inflow direction and the outflow direction of the liquid for the intermediate tube 75 to be different from the central axis O2, without performing a special working to the upstream-side tube 22a and the downstream-side tube 22b.

In this case, a downstream end opening portion of the upstream-side tube 22a and an upstream end opening portion of the downstream-side tube 22b are also used as the first opening portion and the second opening portion.

Figure 35:
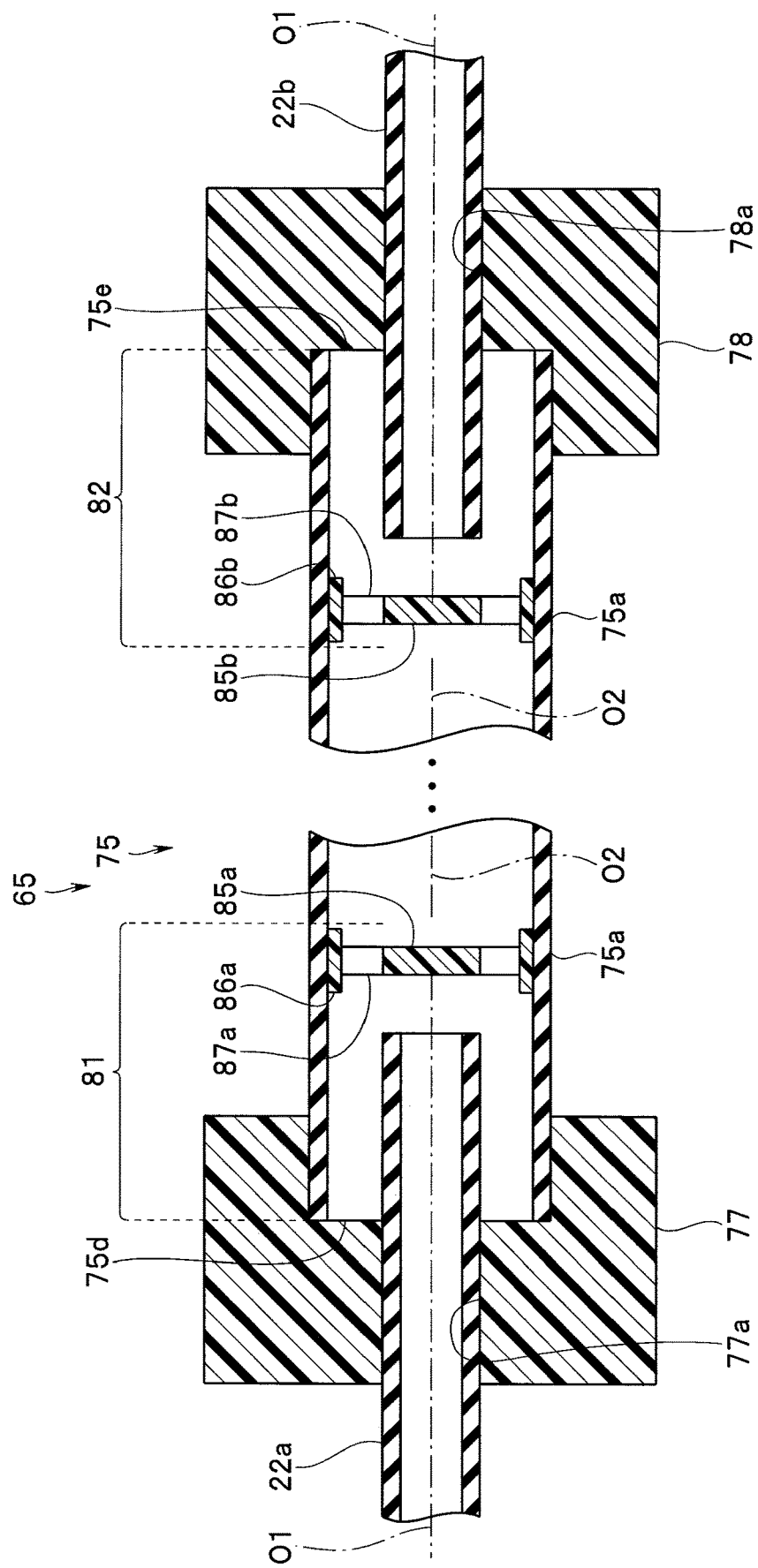
FIG. 35 is a cross-sectional view showing principal parts of an upstream side and a downstream side of a medical solid-matter collection apparatus according to an eleventh modification of the second embodiment of the present disclosure.

For example, as shown in FIG. 35, a first shield member 85a facing the downstream end opening portion of the upstream-side tube 22a may be provided in the interior of the intermediate tube 75.

Figure 36:
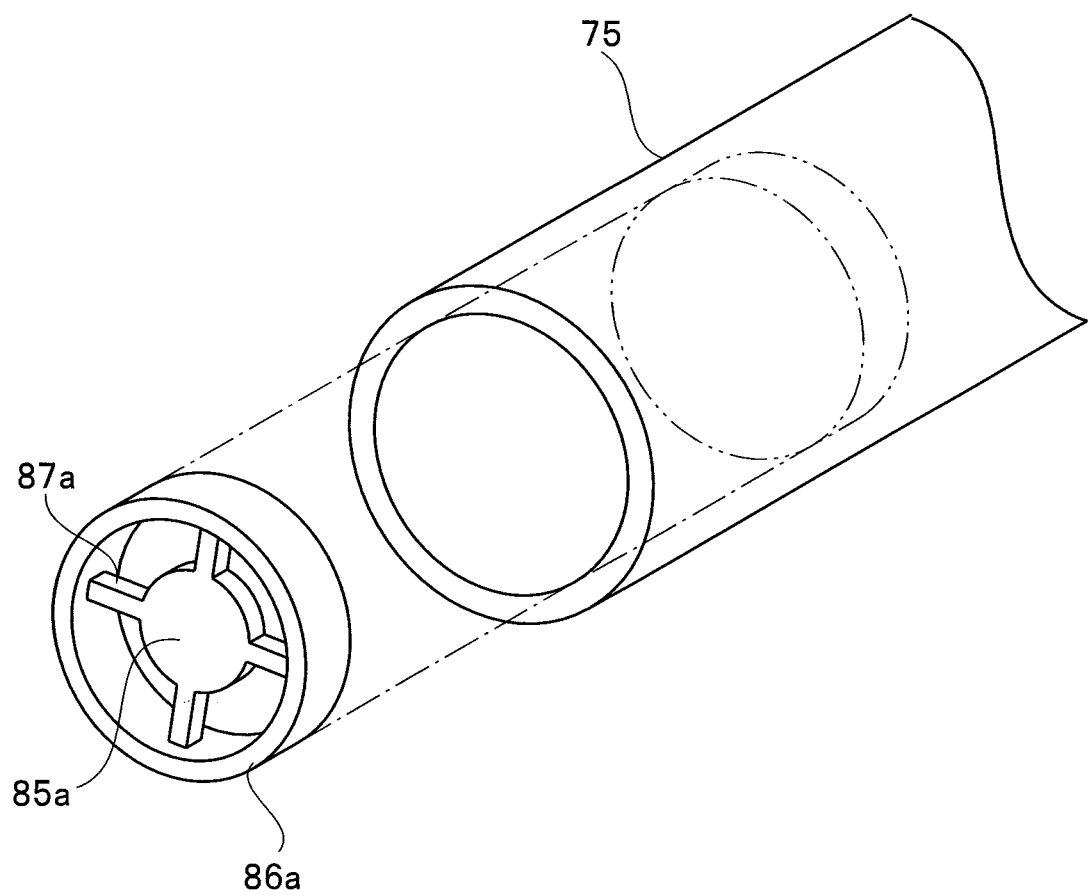
FIG. 36 is a perspective view showing a principal part of an intermediate tube according to the eleventh modification of the second embodiment of the present disclosure.

For example, as shown in FIGS. 35 and 36, the first shield member 85a may be supported by a ring member 86a fixed to an inner circumferential surface of the intermediate tube 75, through a plurality of spokes 87a.

Similarly, a second shield member 85b facing the upstream end opening portion of the downstream-side tube 22b may be provided in the interior of the intermediate tube 75.

As shown in FIG. 35, the second shield member 85b may be supported by a ring member 86b fixed to an inner circumferential surface of the intermediate tube 75, through a plurality of spokes 87b.

In this case, a gap between the downstream end of the upstream-side tube 22a and the first shield member 85a corresponds to the first opening portion, and a gap between the upstream end of the downstream-side tube 22b and the second shield member 85b corresponds to the second opening portion.

Figure 37:
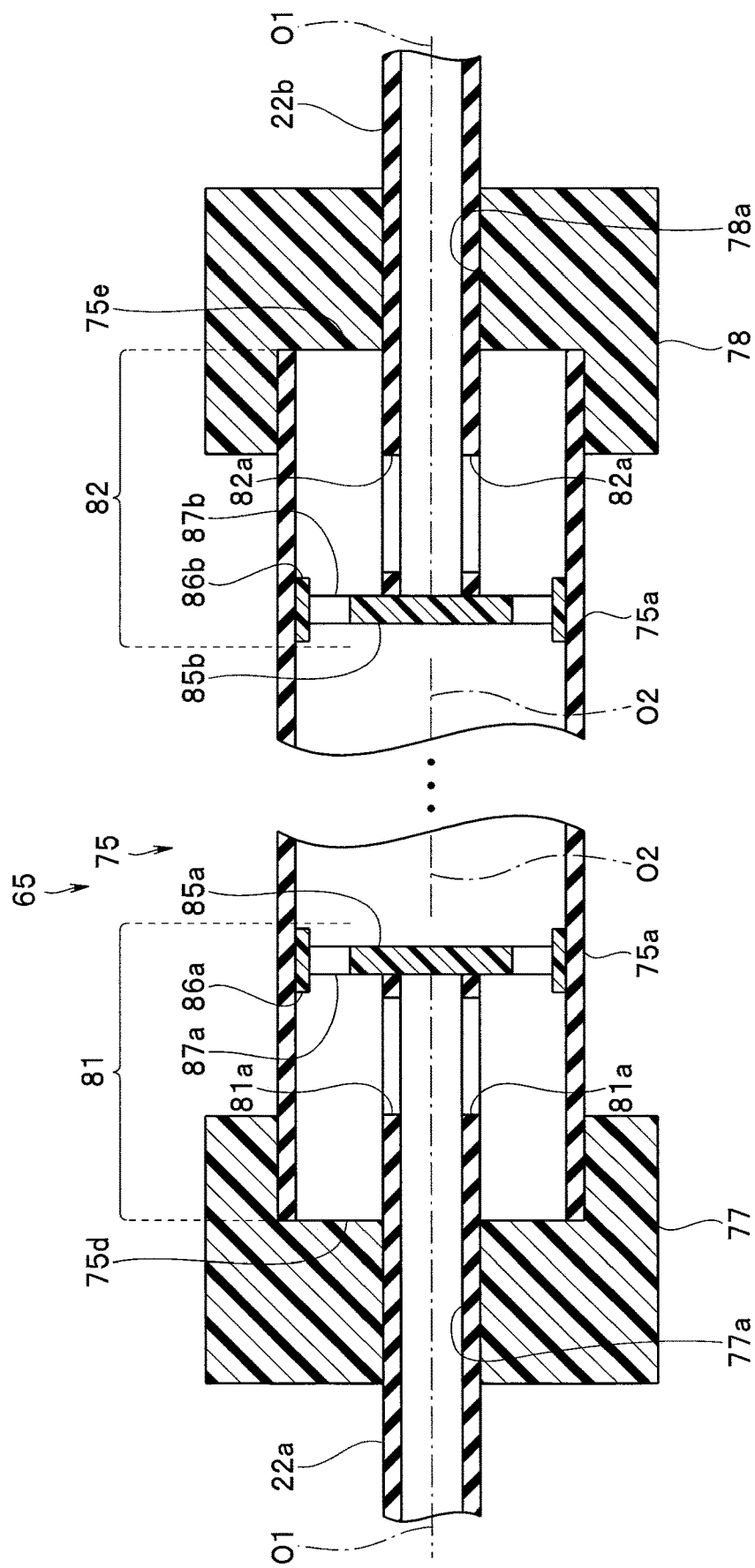
FIG. 37 is a cross-sectional view showing principal parts of an upstream side and a downstream side of a medical solid-matter collection apparatus according to a twelfth modification of the second embodiment of the present disclosure.

For example, as shown in FIG. 37, it is allowable to employ a configuration in which the downstream end opening portion of the upstream-side tube 22a is pressed against the first shield member 85a.

In this case, by providing the first opening portion 81a on the upstream-side tube 22a, it is possible to cause the inflow direction of the liquid to the intermediate tube 75 to be different from the central axis O2.

Furthermore, for example, when the outer diameter of the first shield member 85a is set to a larger value than the outer diameter of the upstream-side tube 22a, it is possible to further change the flow of the liquid.

Similarly, it is allowable to employ a configuration in which the upstream end opening portion of the downstream-side tube 22b is pressed against the second shield member 85b.

In this case, by providing the second opening portion 82a on the downstream-side tube 22b, it is possible to cause the outflow direction of the liquid from the intermediate tube to be different from the central axis O2.

Furthermore, for example, when the outer diameter of the second shield member 85b is set to a larger value than the outer diameter of the downstream-side tube 22b, it is possible to further change the flow of the liquid. An interior of the intermediate tube includes a shield. A portion of the upstream-side tube 22a is inserted into the intermediate tube 75 and a second portion of the upstream-side tube 22a is connected to the inflow tube, wherein the first portion of the upstream-side tube 22a includes a first end and a first circumferential wall, and wherein the first end faces toward the shield. A first portion of the downstream-side tube 22b is inserted into the intermediate tube 75 and a second portion of the downstream-side tube 22b is connected to the outflow tube, wherein the first portion of the downstream-side tube 22b includes a second end and second circumferential wall, and wherein the second end faces toward the shield.

Note that the present disclosure is not limited to the respective embodiments and the respective modifications described above, various modifications and alterations can be made, and the modifications and the alterations also are within the technical scope of the present disclosure.

Needless to say, for example, configurations of the above-described embodiments and respective modifications may be combined when appropriate.

(Example 1) A medical solid-matter collection apparatus comprising:
 a tube interposed in a liquid suction conduit configured to cause a liquid in which a solid matter is mixed, to flow to a suction apparatus disposed outside of a subject;
 a liquid inflow portion provided at one end of the tube and configured to cause the liquid to flow into the tube from the liquid suction conduit;
 a liquid outflow portion provided at another end of the tube and configured to cause the liquid to flow out of the tube to the liquid suction conduit;
 a large-diameter portion provided in the tube between the liquid inflow portion and the liquid outflow portion and formed so as to have an inner diameter larger than an inner diameter of the liquid suction conduit that is connected to the liquid inflow portion;
 a first path formed in the large-diameter portion and configured to cause the liquid flowing from the liquid inflow portion to the liquid outflow portion to fall in a gravity direction; and
 a second path formed in the large-diameter portion and configured to cause the liquid flowing from the liquid inflow portion to the liquid outflow portion to rise in a reverse direction of the gravity direction.

(Example 2) The medical solid-matter collection apparatus according to Example 1, wherein
 a direction in which the liquid inflow portion causes the liquid to flow into an interior of the large-diameter portion is a direction that has a component in a horizontal direction or a gravity downward direction.

(Example 3) The medical solid-matter collection apparatus according to Example 1, wherein
 the large-diameter portion includes a loop portion configured to swirl the liquid from the liquid inflow portion and then lead the liquid to the liquid outflow portion.

(Example 4) The medical solid-matter collection apparatus according to Example 3, wherein
the loop portion is fixed so as to draw a circular arc that rotates the liquid from the liquid inflow portion by ¾ of a rotation or more.

(Example 5) The medical solid-matter collection apparatus according to Example 1, wherein
the inner diameter of the large-diameter portion is two times or more the inner diameter of the liquid suction conduit that is connected to the liquid inflow portion.

(Example 6) The medical solid-matter collection apparatus according to Example 1, wherein
the large-diameter portion includes an enlarged-diameter portion in which the inner diameter of the large-diameter portion is partially enlarged.

(Example 7) The medical solid-matter collection apparatus according to Example 6, wherein
the enlarged-diameter portion is a rotation body around a longitudinal axis of the tube.

(Example 8) The medical solid-matter collection apparatus according to Example 1, comprising
a connector configured at an end portion of the large-diameter portion in a detachable manner.

(Example 9) The medical solid-matter collection apparatus according to Example 1, wherein
the large-diameter portion includes an air tank at a midway portion.

(Example 10) The medical solid-matter collection apparatus according to Example 9, wherein
a capacity of the air tank is 5 to 30 cm$^3$.

(Example 11) The medical solid-matter collection apparatus according to Example 9, wherein
the air tank includes a wall configured to separate a gas and the liquid in an interior of the air tank and configured to be capable of extending and contracting.

(Example 12) A medical suction system comprising:
a suction apparatus disposed outside of a subject;
a liquid suction conduit configured to cause a liquid in which a solid matter is mixed, to flow from an interior of the subject to the suction apparatus; and
the medical solid-matter collection apparatus according to Example 1, the medical solid-matter collection apparatus being interposed at a midway portion of the liquid suction conduit.

(Example 13) The medical suction system according to Example 12, further comprising
a filter interposed at a midway portion of the liquid suction conduit on a downstream side of the medical solid-matter collection apparatus.

(Example 14) The medical suction system according to Example 12, further comprising
a flowmeter interposed at a midway portion of the liquid suction conduit on the downstream side of the medical solid-matter collection apparatus, and configured to measure a flow rate of the liquid that flows through the liquid suction conduit; and
an air chamber interposed at a midway portion of the liquid suction conduit between the medical solid-matter collection apparatus and the flowmeter.

What is claimed is:

1. A medical solid-matter collection apparatus, comprising:
an inflow tube comprising a first conduit having a first inner diameter;
an outflow tube comprising a second conduit having a second inner diameter; and
a solid-matter collection tube having a first end and a second end, the first end connected to the inflow tube and the second end connected to the outflow tube,
wherein the solid-matter collection tube has a third inner diameter, the third inner diameter being larger than the first inner diameter and the second inner diameter,
wherein the solid-matter collection tube defines a flow path,
wherein the flow path includes:
a first flow path portion configured to direct a liquid flowing along the flow path in a first direction, and
a second flow path portion configured to direct the liquid flowing from the first flow path portion in a second direction,
wherein the first direction is opposite to the second direction, and
wherein the solid-matter collection tube collects medical solid-matter at a first point in the flow path where the first diameter and the second diameter change to the third diameter and at a second point in the flow path where the first flow path portion changes to the second flow path portion.

2. The medical solid-matter collection apparatus according to claim 1, wherein the flow path defined by the solid-matter collection tube comprises a loop,
wherein the loop has an angle of rotation of 360 degrees or more, and
wherein, in the loop, a first portion of the solid-matter collection tube overlaps with a second portion of the solid-matter collection tube.

3. The medical solid-matter collection apparatus according to claim 1, wherein the third inner diameter is larger than the first inner diameter by two times or more.

4. The medical solid-matter collection apparatus according to claim 1, wherein the solid-matter collection tube comprises an enlarged-diameter portion that has a fourth inner diameter, and wherein the fourth inner diameter is larger than the third inner diameter.

5. The medical solid-matter collection apparatus according to claim 4, wherein walls of the enlarged-diameter portion of the solid-matter collection tube form a portion of a surface of a solid of revolution, wherein a portion of an axis of the solid of revolution is collocated with a longitudinal axis of the solid-matter collection tube.

6. The medical solid-matter collection apparatus according to claim 4, wherein walls of the enlarged-diameter portion of the solid-matter collection tube form a portion of a surface of a polygon.

7. The medical solid-matter collection apparatus according to claim 4, wherein the solid-matter collection tube collects medical solid-matter at the enlarged-diameter portion.

8. The medical solid-matter collection apparatus according to claim 1, further comprising at least one of:
a first connector detachably connecting the inflow tube and the first end of the solid-matter collection tube, and
a second connector detachably connecting the outflow tube and the second end of the solid-matter collection tube.

9. The medical solid-matter collection apparatus according to claim 1, wherein the solid-matter collection tube includes an air tank.

10. The medical solid-matter collection apparatus according to claim 9, wherein the air tank includes an interior wall separating an interior volume of the air tank into a first volume and a second volume, wherein one of the first volume and the second volume is in fluid communication with an interior of the solid-matter collection tube, and wherein the interior wall is flexible.

11. The medical solid-matter collection apparatus according to claim 1, further comprising at least one of:
a first pipe, wherein a first portion of the first pipe is inserted into the solid-matter collection tube and a second portion of the first pipe is connected to the inflow tube, wherein the first portion of the first pipe has a first opening configured to direct the liquid exiting the first opening in a direction intersecting a central axis of the solid-matter collection tube, and
a second pipe, wherein a first portion of the second pipe is inserted into the solid-matter collection tube and a second portion of the second pipe is connected to the outflow tube, wherein the first portion of the second pipe has a second opening configured to direct the liquid exiting the second opening in a direction intersecting the central axis of the solid-matter collection tube.

12. The medical solid-matter collection apparatus according to claim 11, wherein the first pipe has a first outer diameter and the second pipe has a second outer diameter, and
wherein the first outer diameter and the second outer diameter are smaller than the third inner diameter.

13. The medical solid-matter collection apparatus according to claim 11, wherein the first opening is in a circumferential side wall of the first portion of the first pipe, and
wherein the second opening is in a circumferential side wall of the first portion of the second pipe.

14. The medical solid-matter collection apparatus according to claim 13, wherein at least one of a first end surface of the first portion of the first pipe and a first end surface of the first portion of the second pipe is sealed.

15. The medical solid-matter collection apparatus according to claim 11, wherein at least one of the first portion of the first pipe and the first portion of the second pipe include a curved portion.

16. The medical solid-matter collection apparatus according to claim 11, wherein at least one of the first pipe and the second pipe has a fifth inner diameter different from the first inner diameter and the second inner diameter.

17. The medical solid-matter collection apparatus according to claim 1, wherein an interior of the solid-matter collection tube includes a shield, and
wherein the medical solid-matter collection apparatus further comprises at least one of:
a first pipe, wherein a first portion of the first pipe is inserted into the solid-matter collection tube and a second portion of the first pipe is connected to the inflow tube, wherein the first portion of the first pipe includes a first end and a first circumferential side wall, and wherein the first end faces toward the shield, and
a second pipe, wherein a first portion of the second pipe is inserted into the solid-matter collection tube and a second portion of the second pipe is connected to the outflow tube, wherein the first portion of the second pipe includes a second end and second circumferential side wall, and wherein the second end faces toward the shield.

18. The medical solid-matter collection apparatus according to claim 1, further comprising a stepper at the first point in the flow path,
wherein the solid-matter collection tube collects medical solid-matter at the stepper.

19. The medical solid-matter collection apparatus according to claim 1, wherein the first direction is different from a third direction of an inflow path flowing along the inflow tube, and
wherein the solid-matter collection tube collects medical solid-matter at a point where the inflow path changes to the first flow path portion.

20. A medical suction system, comprising:
an insertion apparatus configured to be inserted into a subject;
a suction apparatus provided outside of the subject and the insertion apparatus and configured to suction a liquid; and
a medical solid-matter collection apparatus provided between the insertion apparatus and the suction apparatus,
wherein the medical solid-matter collection apparatus includes:
an inflow tube comprising a first conduit having a first inner diameter, and in fluid communication with the insertion apparatus,
an outflow tube comprising a second conduit having a second inner diameter, and in fluid communication with the suction apparatus, and
a solid-matter collection tube having a first end and a second end, the first end connected to the inflow tube and the second end connected to the outflow tube,
wherein the solid-matter collection tube has a third inner diameter, the third inner diameter being larger than the first inner diameter and the second inner diameter,
wherein the solid-matter collection tube defines a flow path,
wherein the flow path includes:
a first flow path portion configured to direct a liquid flowing along the flow path in a first direction, and
a second flow path portion configured to direct the liquid flowing from the first low path portion in second direction,
wherein the first direction is opposite to the second direction, and
wherein the solid-matter collection tube collects medical solid-matter at a first point in the flow path where the first diameter and the second diameter change to the third diameter and at a second point in the flow path where the first flow path portion changes to the second flow path portion.

21. The medical suction system according to claim 20, further comprising a filter provided between the intermediate tube and the suction apparatus.

22. The medical suction system according to claim 21, further comprising
a flowmeter provided between the insertion apparatus and the suction apparatus on a downstream side of the medical solid-matter collection apparatus, and configured to measure a flow rate of the liquid that flows through one of more of the first conduit and the second conduit, and
an air chamber provided between the medical solid-matter collection apparatus and the flowmeter.

* * * * *